(12) United States Patent
Toyota et al.

(10) Patent No.: US 11,163,432 B2
(45) Date of Patent: Nov. 2, 2021

(54) INFORMATION PROCESSING SYSTEM, ELECTRONIC BLACKBOARD APPARATUS, AND RECORDING MEDIUM

(71) Applicants: Yukinari Toyota, Kanagawa (JP); Shigeo Araki, Kanagawa (JP); Naoki Fukasawa, Kanagawa (JP)

(72) Inventors: Yukinari Toyota, Kanagawa (JP); Shigeo Araki, Kanagawa (JP); Naoki Fukasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 309 days.

(21) Appl. No.: 16/253,592

(22) Filed: Jan. 22, 2019

(65) Prior Publication Data
US 2019/0235735 A1 Aug. 1, 2019

(30) Foreign Application Priority Data

Jan. 30, 2018 (JP) .............................. JP2018-014180
Jul. 31, 2018 (JP) .............................. JP2018-144469

(51) Int. Cl.
*G06F 3/0484* (2013.01)
*G06F 3/041* (2006.01)
*G06F 9/30* (2018.01)
*G06F 3/0354* (2013.01)

(52) U.S. Cl.
CPC ........ *G06F 3/04845* (2013.01); *G06F 3/0354* (2013.01); *G06F 3/0416* (2013.01); *G06F 9/3004* (2013.01)

(58) Field of Classification Search
None
See application file for complete search history.

(56) References Cited

U.S. PATENT DOCUMENTS

| 8,020,170 B2 | 9/2011 | Fukasawa |
| 8,264,743 B2 | 9/2012 | Fukasawa |
| 8,477,325 B2 | 7/2013 | Fukasawa |
| 8,705,089 B2 | 4/2014 | Araki |

(Continued)

FOREIGN PATENT DOCUMENTS

| JP | H11-305623 | 11/1999 |
| JP | 2009-033253 | 2/2009 |

(Continued)

*Primary Examiner* — Justin S Lee
(74) *Attorney, Agent, or Firm* — IPUSA, PLLC

(57) ABSTRACT

An information processing system for transmitting data relating to an image to be displayed, includes a hardware processor configured to store a setting for using an external service, the setting for using the external service being stored in association with a user among one or more users; store transmission destination setting information in which the external service is set as a transmission destination to which the data is addressed, the transmission destination setting information being stored in association with a user among the one or more users; identify the one or more users; and transmit the data to the transmission destination corresponding to the external service, based on the transmission destination setting information associated with each of the identified one or more users, the transmission destination corresponding to the external service being different for each of the one or more users.

15 Claims, 52 Drawing Sheets

(56) References Cited

U.S. PATENT DOCUMENTS

| | | | |
|---|---|---|---|
| 8,707,298 B2 | 4/2014 | Araki | |
| 8,786,869 B2 | 7/2014 | Araki | |
| 8,848,224 B2 | 9/2014 | Fukasawa | |
| 9,013,724 B2 | 4/2015 | Araki | |
| 9,052,850 B2 | 6/2015 | Araki | |
| 9,471,328 B2 | 10/2016 | Fukasawa | |
| 9,717,001 B2 | 7/2017 | Toyota | |
| 9,794,447 B2 | 10/2017 | Fukasawa et al. | |
| 9,904,495 B2 | 2/2018 | Fukasawa | |
| 2005/0049934 A1* | 3/2005 | Nakayama | G06Q 99/00 705/500 |
| 2011/0058219 A1 | 3/2011 | Fukasawa | |
| 2012/0047365 A1* | 2/2012 | Mercer | G06F 21/606 713/168 |
| 2014/0089662 A1* | 3/2014 | Huang | H04W 12/06 713/165 |
| 2014/0215551 A1* | 7/2014 | Allain | H04L 63/104 726/1 |
| 2014/0293312 A1 | 10/2014 | Fukasawa | |
| 2015/0271293 A1* | 9/2015 | Murata | G06F 40/106 715/274 |
| 2016/0234470 A1* | 8/2016 | Honda | H04B 5/0031 |
| 2016/0269973 A1* | 9/2016 | Miyamoto | H04L 65/1096 |
| 2016/0274834 A1* | 9/2016 | Fukasawa | G06F 3/1238 |
| 2017/0160995 A1 | 6/2017 | Fukasawa et al. | |
| 2017/0171399 A1* | 6/2017 | Yamada | G06F 3/1288 |
| 2017/0212718 A1 | 7/2017 | Nelson et al. | |
| 2017/0315793 A1 | 11/2017 | Kanematsu | |
| 2017/0353525 A1* | 12/2017 | Choi | H04L 67/06 |
| 2018/0067700 A1 | 3/2018 | Araki | |
| 2018/0074763 A1 | 3/2018 | Fukasawa et al. | |
| 2018/0136886 A1 | 5/2018 | Fukasawa | |
| 2019/0020770 A1 | 1/2019 | Araki | |

FOREIGN PATENT DOCUMENTS

| | | |
|---|---|---|
| JP | 2016-139322 | 8/2016 |
| JP | 2017-130202 | 7/2017 |

* cited by examiner

FIG.5A

EXTERNAL SERVICE GROUP SYSTEM A
USER SERVICE A ACCOUNT INFORMATION

| USER ID | NAME | E-MAIL ADDRESS |
|---|---|---|
| office1 | Mary | office1@office.example.com |
| ... | ... | ... |

FIG.5B

EXTERNAL SERVICE GROUP SYSTEM B
USER SERVICE B ACCOUNT INFORMATION

| USER ID | NAME | E-MAIL ADDRESS |
|---|---|---|
| suite2 | Sato | suite2@suite.example.com |
| ... | ... | ... |

FIG.6A

EXTERNAL SERVICE GROUP SYSTEM A
STORAGE SERVICE A STORAGE INFORMATION

| OWNER USER | TYPE | NAME |
|---|---|---|
| office1 | FOLDER | /Folder1 |

FIG.6B

EXTERNAL SERVICE GROUP SYSTEM B
STORAGE SERVICE B STORAGE INFORMATION

| OWNER USER | TYPE | NAME |
|---|---|---|
| suite2 | FOLDER | /WeeklyMeeting |

FIG.7

USER INFORMATION LIST

| USER ID | NAME | E-MAIL ADDRESS | DISTRIBUTION DESTINATION SETTING ID | EXTERNAL SERVICE SETTING ID | IDENTIFICATION INFORMATION |
|---|---|---|---|---|---|
| user001 | Mary Smith | mary@intra.example.com | setting1 | connect1a | ICCARD-123 |
| user002 | Sato Suzuki | sato@intra.example.com | setting2 | connect2b | ICCARD-248 |
| user003 | Alice Liddell | alice@intra.example.com | setting3 | | ICCARD-390 |
| user004 | Chris | chris@intra.example.com | | | |
| ... | ... | ... | ... | ... | ... |

FIG.8

EXTERNAL SERVICE SETTING INFORMATION

| EXTERNAL SERVICE SETTING ID | USER ID | ADDRESS INFORMATION | USER ID OF EXTERNAL SERVICE | AUTHENTICATION TOKEN OF EXTERNAL SERVICE |
|---|---|---|---|---|
| connect1a | user001 | office.example.com | office1 | eyJhbGc11··· |
| connect2b | user002 | suite.example.com | suite2 | eyJhbGc12··· |
| ··· | ··· | ··· | ··· | ··· |

FIG.9

DISTRIBUTION DESTINATION SETTING INFORMATION

| DISTRIBUTION DESTINATION SETTING ID | TRANSMISSION DESTINATION LIST | FILE STORAGE DESTINATION |
|---|---|---|
| setting1 | STORAGE | /Folder1 |
| setting2 | STORAGE, MAIL | /WeeklyMeeting |
| setting3 | MAIL | |
| ... | ... | ... |

FIG.10

PARTICIPANT
MANAGEMENT
INFORMATION LIST

| USER ID |
|---|
| user001 |
| user002 |
| user003 |

FIG.19

EXTERNAL SERVICE GROUP SYSTEM A
USER SERVICE A ACCOUNT INFORMATION (2)

| USER ID | NAME | E-MAIL ADDRESS |
|---|---|---|
| office1 | Mary | office1@office.example.com |
| office2 | Sato | office2@office.example.com |

FIG.20

USER INFORMATION LIST (2)

| USER ID | NAME | E-MAIL ADDRESS | DISTRIBUTION DESTINATION SETTING ID | EXTERNAL SERVICE SETTING ID | IDENTIFICATION INFORMATION |
|---|---|---|---|---|---|
| user001 | Mary Smith | mary@intra.example.com | setting1 | connect1a | ICCARD-123 |
| user002 | Sato Suzuki | sato@intra.example.com | setting2 | connect2a, connect2b | ICCARD-248 |
| user003 | Alice Liddell | alice@intra.example.com | setting3 | | ICCARD-390 |
| user004 | Chris | chris@intra.example.com | | | |
| ... | ... | ... | ... | ... | ... |

FIG.21

EXTERNAL SERVICE SETTING INFORMATION (2)

| EXTERNAL SERVICE SETTING ID | USER ID | ADDRESS INFORMATION | USER ID OF EXTERNAL SERVICE | AUTHENTICATION TOKEN OF EXTERNAL SERVICE |
|---|---|---|---|---|
| connect1a | user001 | office.example.com | office1 | eyJhbGc11··· |
| connect2a | user002 | office.example.com | office2 | eyJhbGca2··· |
| connect2b | user002 | suite.example.com | suite2 | eyJhbGc12··· |
| ⋮ | ⋮ | ⋮ | ⋮ | ⋮ |

FIG.24

EXTERNAL SERVICE GROUP SYSTEM A
SCHEDULE SERVICE A  SCHEDULE INFORMATION

| SCHEDULE ID | SCHEDULE TYPE | OWNER USER | START TIME AND PERIOD | SCHEDULED ATTENDEE | ATTACHED FILE |
|---|---|---|---|---|---|
| sch-1 | MEETING | office1 | 2010-04-05 10:00-12:00 | office1 (Mary <office1@office.example.com>), office2 (Sato <office2@office.example.com>), office3 (Motoko <office3@office.example.com>), | a01.doc |
| ... | ... | ... | ... | ... | ... |

FIG.27

EXTERNAL SERVICE GROUP SYSTEM A  USER SERVICE A  ACCOUNT INFORMATION (3)

| USER ID | NAME | E-MAIL ADDRESS |
|---|---|---|
| office1 | Mary | office1@office.example.com |
| office2 | Sato | office2@office.example.com |
| office3 | Motoko | office3@office.example.com |
| ... | ... | ... |

FIG.28

|  | 1040 |  |
|---|---|---|
| SCHEDULE LIST | | |
| SCHEDULE | PARTICIPANT LIST | ATTACHED FILE |
| 2010-04-05 10:00-12:00 | Mary, Sato, Motoko | a01.doc |

■ READ ATTACHED FILE

SET  ~1042

FIG.29

| USER ID | EXTERNAL SERVICE SETTING INFORMATION | E-MAIL ADDRESS OF EXTERNAL SERVICE |
|---|---|---|
| user001 | | |
| user002 | connect2a | Motoko <office3@office.example.com> |

FIG.30

| DISTRIBUTION DESTINATION SETTING ID | TRANSMISSION DESTINATION LIST | FILE STORAGE DESTINATION |
|---|---|---|
| setting1 | STORAGE, SCHEDULE | /Folder1 |
| setting2 | STORAGE, MAIL | /WeeklyMeeting |
| setting3 | MAIL | |
| ... | ... | ... |

| PARTIC-IPANT | TRANSMISSION DESTINATION |
|---|---|
| Mary | ■ ADD AND STORE TO SCHEDULE OF THIS MEETING<br>■ office.example.com/Folder1 |
| Sato | ■ office.example.com/WeeklyMeeting<br>☐ suite.example.com/WeeklyMeeting<br>☐ sato@intra.example.com<br>■ office2@suite.example.com<br>☐ suite2@suite.example.com |
| Motoko | ■ office3@office.example.com |

DISTRIBUTION SCREEN

TRANSMIT ~1032

FIG.36

EXTERNAL SERVICE GROUP SYSTEM A
SHARED SITE SERVICE A SITE INFORMATION

| SITE ID | SITE NAME | OWNER USER | MEMBER |
|---------|-----------|------------|--------|
| site1 | PROJECT A | office1 | office1 (Mary <office1@office.example.com>), office2 (Sato <office2@office.example.com>), |
| site2 | PROJECT B | office1 | office1 (Mary <office1@office.example.com>), office3 (Motoko <office3@office.example.com>), |
| site3 | DEPARTMENT A | office1 | office1 (Mary <office1@office.example.com>), office2 (Sato <office2@office.example.com>), office3 (Motoko <office3@office.example.com>), |

FIG.40

| DISTRIBUTION DESTINATION SETTING ID | TRANSMISSION DESTINATION LIST | FILE STORAGE DESTINATION |
|---|---|---|
| setting1 | STORAGE, SHARED SITE | /Folder1 |
| setting2 | STORAGE, MAIL | /WeeklyMeeting |
| setting3 | MAIL | |
| ... | | |

FIG.42

| PARTIC-IPANT | TRANSMISSION DESTINATION |
|---|---|
| Mary | ■STORE AS SHARED DOCUMENT OF THIS SITE<br>■office.example.com/Folder1 |
| Sato | ■office.example.com/WeeklyMeeting<br>□suite.example.com/WeeklyMeeting<br>□sato@intra.example.com<br>■office2@suite.example.com<br>□suite2@suite.example.com |
| Motoko | ■office3@office.example.com |

DISTRIBUTION SCREEN — 1060

TRANSMIT — 1062

FIG.45A

ITEM LIST OF ROOT FOLDER

| ITEM ID | NAME | TYPE |
|---|---|---|
| item1 | PROJECT 1 | folder |
| item2 | PROJECT 2 | folder |

FIG.45B

ITEM LIST OF item1 FOLDER

| ITEM ID | NAME | TYPE |
|---|---|---|
| item11 | CASE 1 | folder |
| item12 | CASE 2 | folder |
| item13 | CASE 3 | folder |
| item14 | MEMO. txt | file |

FIG.46

EXTERNAL SERVICE GROUP SYSTEM A  STORAGE SERVICE A  ITEM SHARING INFORMATION

| ITEM ID | SHARE-DESTINATION USER |
|---|---|
| item11 | office1 (Mary <office1@office.example.com>),<br>office2 (Sato <office2@office.example.com>),<br>office3 (Motoko <office3@office.example.com>), |

FIG.50

| DISTRIBUTION DESTINATION SETTING ID | TRANSMISSION DESTINATION LIST | FILE STORAGE DESTINATION |
|---|---|---|
| setting1 | STORAGE, SHARED FOLDER | /Folder1 |
| setting2 | STORAGE, MAIL | /WeeklyMeeting |
| setting3 | MAIL | |
| ... | | |

| DISTRIBUTION SCREEN | |
|---|---|
| PARTIC-IPANT | TRANSMISSION DESTINATION |
| Mary | ■ STORE IN SELECTED SHARED DOCUMENT<br>■ office.example.com/Folder1 |
| Sato | ■ office.example.com/WeeklyMeeting<br>□ suite.example.com/WeeklyMeeting<br>□ sato@intra.example.com<br>■ office2@office.example.com<br>□ suite2@suite.example.com |
| Motoko | ■ office3@office.example.com |

TRANSMIT ~1220

INFORMATION PROCESSING SYSTEM, ELECTRONIC BLACKBOARD APPARATUS, AND RECORDING MEDIUM

CROSS-REFERENCE TO RELATED APPLICATION

The present application is based on and claims priority under 35 U.S.C. § 119 to Japanese Patent Application No. 2018-014180, filed on Jan. 30, 2018 and Japanese Patent Application No. 2018-144469, filed on Jul. 31, 2018, the contents of which are incorporated herein by reference in their entirety.

BACKGROUND OF THE INVENTION

1. Field of the Invention

The present invention relates to an information processing system, an electronic blackboard apparatus, and a recording medium.

2. Description of the Related Art

In the related art, electronic blackboard apparatuses are used at meetings in which a plurality of users participates. The electronic blackboard apparatus of the related art includes a transmitting unit that transmits an image, which is displayed on the screen, by e-mail; an identifying unit that identifies a user; and a destination input unit that sets the e-mail address of the identified user, as a destination.

In such an electronic blackboard apparatus of the related art, the identifying unit identifies the user who has seen the image on the screen, and identifies the e-mail address of the identified user. The destination input unit inputs the identified e-mail address as the destination of the e-mail for transmitting the image displayed on the screen. Then, the transmitting unit transmits the e-mail, in which the e-mail address of the identified user set as the destination (for example, see Patent Document 1).

Patent Document 1: Japanese Unexamined Patent Application Publication No. 2009-33253

SUMMARY OF THE INVENTION

An aspect of the present invention provides an information processing system, an electronic blackboard apparatus, and a recording medium, in which one or more of the disadvantages of the related art are reduced.

According to one aspect of the present invention, there is provided an information processing system for transmitting data relating to an image to be displayed, the information processing system including a hardware processor configured to store, in a hardware memory, a setting for using an external service, the setting for using the external service being stored in association with a user among one or more users; store, in the hardware memory, transmission destination setting information in which the external service is set as a transmission destination to which the data is addressed, the transmission destination setting information being stored in association with a user among the one or more users; identify the one or more users; and transmit, over a wired or wireless communication network, the data to the transmission destination corresponding to the external service, based on the transmission destination setting information associated with each of the identified one or more users, the transmission destination corresponding to the external service being different for each of the one or more users, wherein the data is collectively transmitted to the different transmission destinations that have been set, by the hardware processor, as destinations to which the data is to be transmitted.

BRIEF DESCRIPTION OF THE DRAWINGS

FIGS. 5A and 5B are configuration diagrams of an example of user service account information according to the first embodiment of the present invention;

FIGS. 6A and 6B are configuration diagrams of an example of storage service storage information according to the first embodiment of the present invention;

FIG. 7 is a configuration diagram of an example of a user information list according to the first embodiment of the present invention;

FIG. 8 is a configuration diagram of an example of external service setting information according to the first embodiment of the present invention;

FIG. 9 is a configuration diagram of an example of distribution destination setting information according to the first embodiment of the present invention;

FIG. 10 is a configuration diagram of an example of a participant management information list according to the first embodiment of the present invention;

FIG. 19 is a configuration diagram of an example of user service account information according to a second embodiment of the present invention;

FIG. 20 is a configuration diagram of an example of a user information list according to the second embodiment of the present invention;

FIG. 21 is a configuration diagram of an example of external service setting information according to the second embodiment of the present invention;

FIG. 24 is a configuration diagram of an example of schedule service schedule information according to the third embodiment of the present invention;

FIG. 27 is a configuration diagram of an example of user service account information according to the third embodiment of the present invention;

FIG. 28 is an image diagram of an example of a schedule list screen according to the third embodiment of the present invention;

FIG. 29 is a configuration diagram of an example of a participant management information list according to the third embodiment of the present invention;

FIG. 30 is a configuration diagram of an example of distribution destination setting information according to the third embodiment of the present invention;

FIG. 33 is an image diagram of an example of a distribution screen according to the third embodiment of the present invention;

FIG. 36 is a configuration diagram of an example of shared site service site information according to the fourth embodiment of the present invention;

FIG. 40 is a configuration diagram of an example of distribution destination setting information according to the fourth embodiment of the present invention;

FIG. 42 is an image diagram of an example of a distribution screen according to the fourth embodiment of the present invention;

FIGS. 45A and 45B are configuration diagrams of an example of storage service item hierarchy information according to the fifth embodiment of the present invention;

FIG. 46 is a configuration diagram of an example of storage service item sharing information according to the fifth embodiment of the present invention;

FIG. 50 is a configuration diagram of an example of distribution destination setting information according to the fifth embodiment of the present invention;

FIG. 52 is an image diagram of an example of a distribution screen according to the fifth embodiment of the present invention.

DETAILED DESCRIPTION OF THE PREFERRED EMBODIMENTS

With the spread of cloud computing in recent years, users can use external services such as a storage service and a mail service, for example. Therefore, for example, it would be convenient for a user who participates in a meeting using an electronic blackboard, if he/she can set an external service that he/she can use, as the transmission destination or the storage destination of the image displayed on the screen. However, it is necessary to make a setting for using the external service for each user, and there has been a problem that this takes time and labor.

A problem to be solved by an embodiment of the present invention is to provide an information processing system capable of reducing the labor for selecting an external service, for which a setting for usage needs to be made for each user, as the transmission destination, in the case of transmitting data related to an image to be displayed.

Embodiments of the present invention will be described by referring to the accompanying drawings. In the present embodiment, an example of an electronic blackboard apparatus used in a meeting, in which a plurality of users participate, is described; however, the application of the electronic blackboard apparatus is not limited to a meeting; the electronic blackboard apparatus may be applied to various situations in which a plurality of users view the screen of the electronic blackboard apparatus, such as seminars and lectures, etc.

First Embodiment

<System Configuration-First Embodiment>

Figure 1:
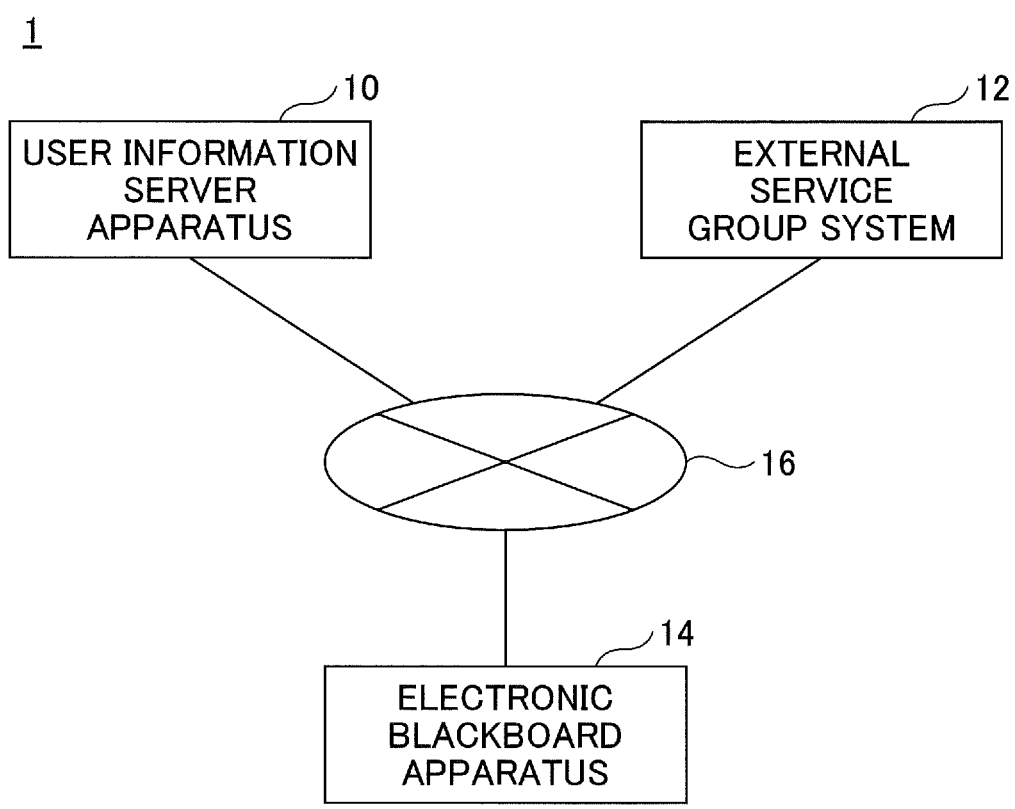
FIG. 1 is a configuration diagram of an example of an information processing system according to a first embodiment of the present invention.

FIG. 1 is a configuration diagram of an example of an information processing system according to a first embodiment. In an information processing system 1 of FIG. 1, a user information server apparatus 10, at least one external service group system 12, and an electronic blackboard apparatus 14 are connected so as to communicate via a network 16 such as the Internet or a Local Area Network (LAN). The user information server apparatus 10 and the electronic blackboard apparatus 14 form an electronic blackboard system. The user information server apparatus 10 and the electronic blackboard apparatus 14 operate in cooperation with the external service group system 12 that is outside the electronic blackboard system, and provide functions related to the electronic blackboard apparatus 14. Note that there may be multiple electronic blackboard apparatuses 14.

An external service group provided by the external service group system 12 refers to an integrated service such as Office 365 (registered trademark) formed of a user service, a storage service, and a mail service, etc. The external service group is provided in such a way that services such as a user service, a storage service, and a mail service, etc., can be used with the same user account. These external service groups may be different for each user, and there may be one or more external service groups. The external service group system 12 is implemented by one or more computers.

The user information server apparatus 10 stores user information lists, external service setting information, and distribution destination setting information, etc., which will be described later, and the user information server apparatus 10 is used from the electronic blackboard apparatus 14 or the external service group system 12. The user information server apparatus 10 may be shared by a plurality of the electronic blackboard apparatuses 14 or may not be on the same network segment. Furthermore, the user information server apparatus 10 may be built in the electronic blackboard apparatus 14. The user information server apparatus 10 is implemented by one or more computers.

The electronic blackboard apparatus 14 is used at a meeting in which a plurality of users participates. The electronic blackboard apparatus 14 displays, for example, an image drawn with an electronic pen or a hand. Furthermore, the electronic blackboard apparatus 14 can also display images of electronic files read out from a Universal Serial Bus (USB) memory, a Personal Computer (PC) connected via a cable, or the external service group system 12, etc. The electronic blackboard apparatus 14 has a function of collectively distributing the image data of the displayed image to the participants of the meeting. The distribution destination to which the electronic blackboard apparatus 14 distributes the image data includes the external service group system 12 that requires usage settings for each user as described later. The electronic blackboard apparatus 14 is one example, and any device may be used as long as the device has a function of storing and distributing (transmitting) data to be displayed, such as a remote meeting system, a display, and a projector, etc.

Note that the configuration of the information processing system 1 illustrated in FIG. 1 is one example. For example, at least a part of the functions of the user information server apparatus 10 or the external service group system 12 may be provided in the electronic blackboard apparatus 14. In the information processing system 1, at least part of the functions of the user information server apparatus 10, the external service group system 12, or the electronic blackboard apparatus 14, may be implemented by an information processing apparatus other than the user information server apparatus 10, the external service group system 12, and the electronic blackboard apparatus 14.

<Hardware Configuration-First Embodiment>
<<Computer-First Embodiment>>

Figure 2:
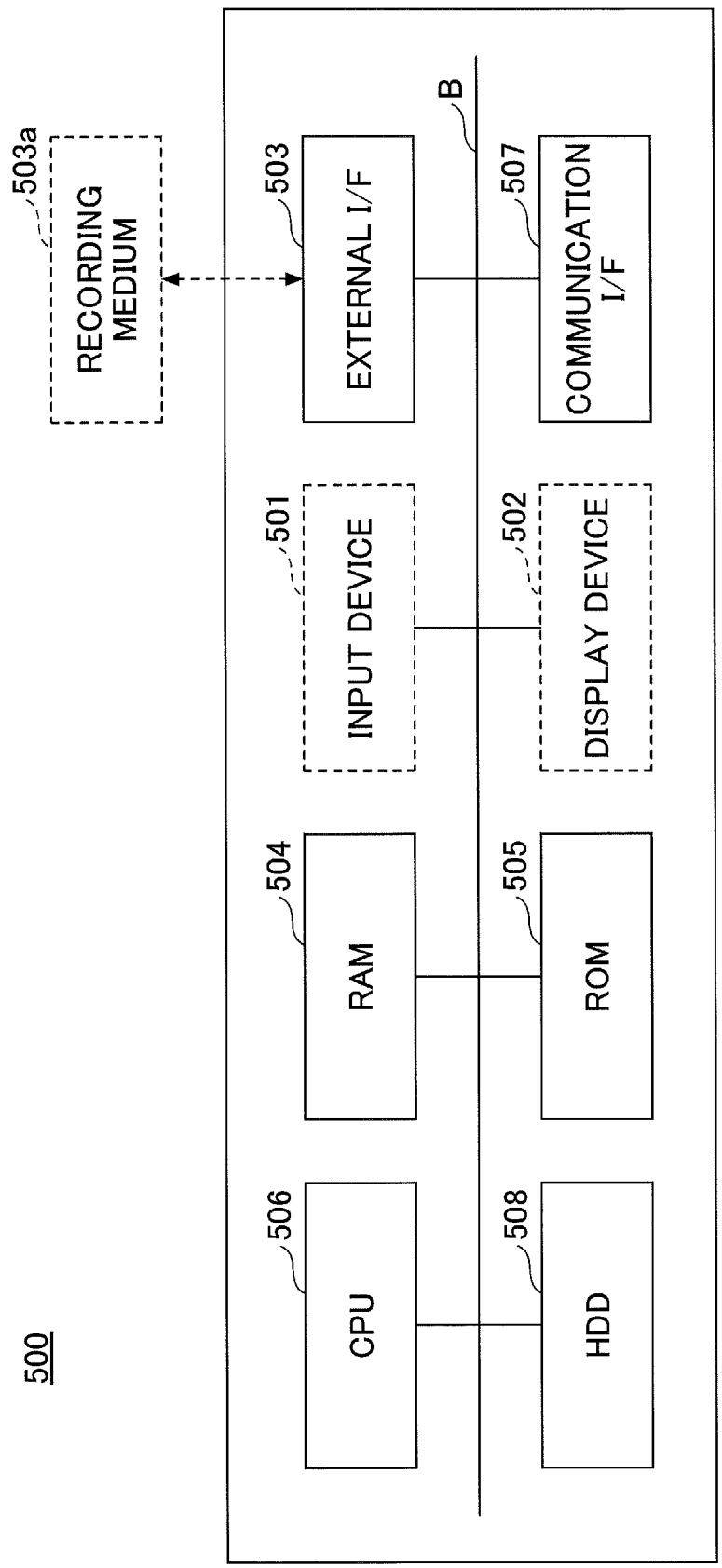
FIG. 2 is a hardware configuration diagram of an example of a computer according to the first embodiment of the present invention.

The user information server apparatus 10 and the external service group system 12 in FIG. 1 are implemented by a computer having a hardware configuration as illustrated in FIG. 2, for example. FIG. 2 is a hardware configuration diagram of an example of a computer.

A computer 500 illustrated in FIG. 2 includes an input device 501, a display device 502, an external interface (I/F) 503, a random access memory (RAM) 504, a read-only memory (ROM) 505, a central processing unit (CPU) 506, a communication I/F 507, and a hard disk drive (HDD) 508, etc., which are mutually connected via a bus B. Note that the input device 501 and the display device 502 may be connected and used when necessary.

The input device 501 includes a keyboard, a mouse, and a touch panel, etc., and is used by a user to input operation signals. The display device 502 includes a display, etc., and displays the processing result obtained by the computer 500.

The communication I/F 507 is an interface for connecting the computer 500 to various networks. Accordingly, the computer 500 can perform data communication via the communication I/F 507.

Furthermore, the HDD 508 is an example of a nonvolatile storage device that stores programs and data. The stored programs and data include an operating System (OS) that is basic software for controlling the entire computer 500, and applications that provide various functions on the OS. Note that the computer 500 may use a drive device (for example, a solid state drive: SSD) that uses a flash memory as a storage medium, instead of the HDD 508.

The external I/F 503 is an interface with respect to an external device. The external device includes a recording medium 503a, etc. Accordingly, the computer 500 can read and/or write information from/in the recording medium 503a via the external I/F 503. The recording medium 503a includes a flexible disk, compact disc (CD), a digital versatile disc (DVD), a secure digital (SD) memory card, a universal serial bus (USB) memory, and a Subscriber Identity Module (SIM) card, etc.

The ROM 505 is an example of a nonvolatile semiconductor memory (storage device) that can hold programs and data even when the power is turned off. The ROM 505 stores programs and data such as Basic Input/Output System (BIOS) settings, OS settings, and network settings, etc., which are executed when the computer 500 is activated. The RAM 504 is an example of a volatile semiconductor memory (storage device) that temporarily holds programs and data.

The CPU 506 is an arithmetic device that implements control and functions of the entire computer 500 by loading programs and data from a storage device such as the ROM 505 and the HDD 508, into the RAM 504, and executing processes. The CPU 506 may be implemented by one processor or a plurality of processors.

The user information server apparatus 10 and the external service group system 12 can implement various kinds of processes as described later by the hardware configuration of the computer 500 illustrated in FIG. 2, for example.

<<Electronic Blackboard Apparatus-First Embodiment>>

Figure 3:
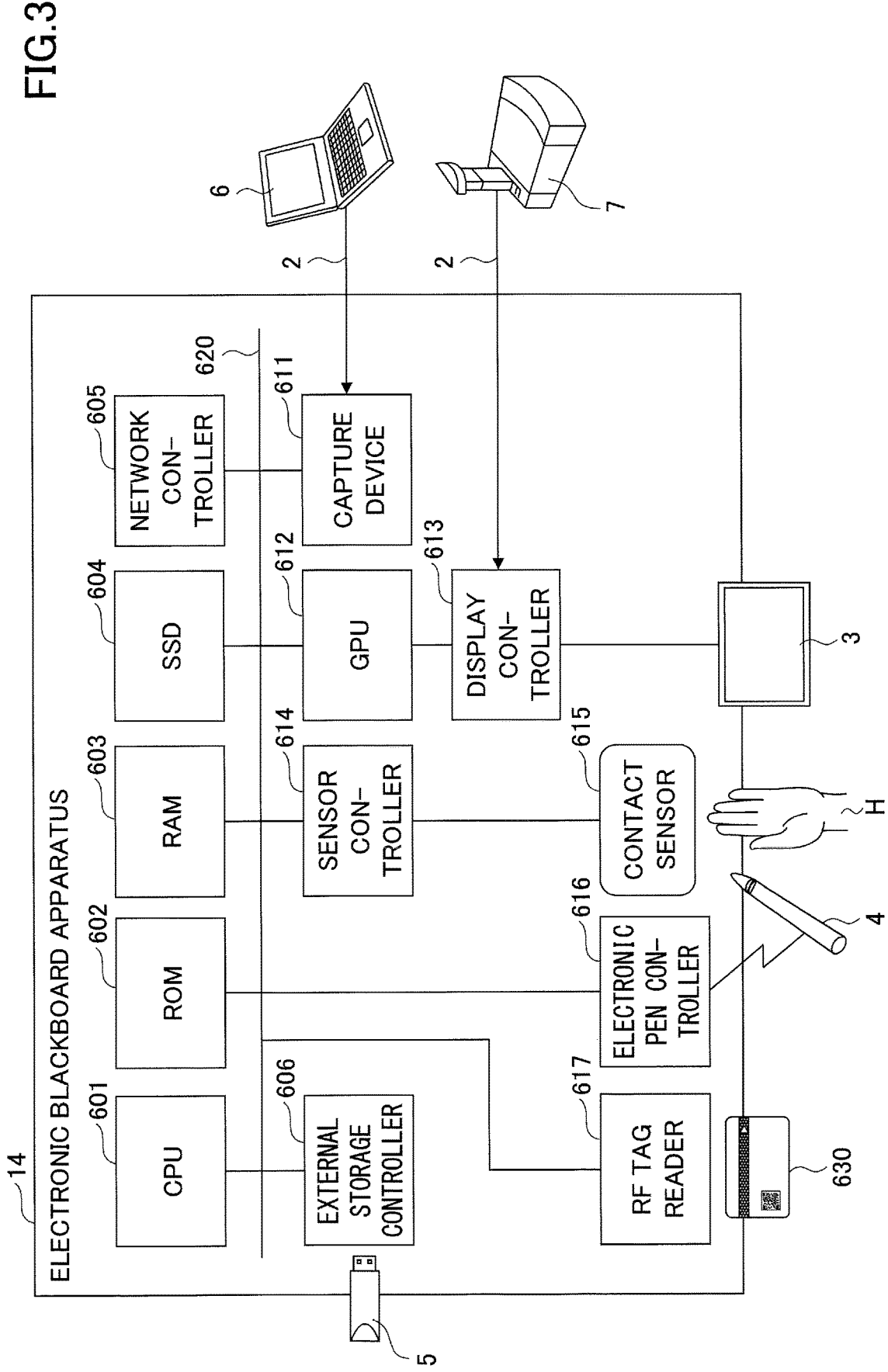
FIG. 3 is a hardware configuration diagram of an example of an electronic blackboard apparatus according to the first embodiment of the present invention.

FIG. 3 is a hardware configuration diagram of an example of the electronic blackboard apparatus. The electronic blackboard apparatus 14 includes a CPU 601, a ROM 602, a RAM 603, an SSD 604, a network controller 605, and an external storage controller 606.

The CPU 601 controls the operations of the entire electronic blackboard apparatus 14. The ROM 602 stores programs used for driving the CPU 601. The RAM 603 is used as a work area of the CPU 601. The SSD 604 stores various kinds of data such as programs for the electronic blackboard apparatus 14. The network controller 605 controls communication with the network 16. The external storage controller 606 controls communication with a recording medium such as the USB memory 5.

Furthermore, the electronic blackboard apparatus 14 includes a capture device 611, a Graphics Processing Unit (GPU) 612, a display controller 613, a sensor controller 614, a contact sensor 615, an electronic pen controller 616, and a radio-frequency (RF) tag reader 617.

The capture device 611 captures image information from a personal computer (PC) 6 as a still image or a moving image file. The GPU 612 specializes in graphics. The display controller 613 controls and manages the screen display in order to output the output image from the GPU 612 to a display 3 and an electronic meeting terminal 7. The sensor controller 614 controls the processes of the contact sensor 615. The contact sensor 615 detects that the electronic pen 4 or the user's hand H, etc., has come into contact with the display 3.

The contact sensor 615 performs input of coordinates and detection of coordinates by an infrared shielding method. In the method of inputting coordinates and detecting coordinates, a plurality of infrared rays are emitted in parallel with the display 3 by two light receiving/emitting devices installed at both upper edge portions of the display 3, the infrared rays are reflected by a reflecting member provided around the display 3, and a light receiving element receives the light returning on the same optical path as the optical path of the emitted light. The contact sensor 615 outputs, to the sensor controller 614, the ID of the infrared rays emitted by the two light receiving/emitting devices shielded by an object. The sensor controller 614 identifies the coordinate position that is the contact position of the object.

Furthermore, the contact sensor 615 is not limited to the infrared shielding method; various types of detecting means may be used, such as a capacitance type touch panel that identifies the contact position by detecting a change in electrostatic capacitance; a resistive film type touch panel that identifies the contact position by a voltage change of two opposing resistance films; and an electromagnetic induction type touch panel that identifies the contact position by detecting the electromagnetic induction caused by the contact object being in contact with the display unit.

The electronic pen controller 616 communicates with an electronic pen 4 to determine the presence or absence of the touch of the pen tip or the touch of the pen bottom on the display 3. Note that the electronic pen controller 616 may determine the presence or absence of the touch of a portion of the electronic pen 4 held by the user or other portions of the electronic pen 4.

The RF tag reader 617 reads identification information unique to an integrated circuit (IC) card 630, from an RF tag embedded in the IC card 630, by wireless communication. Note that the RF tag reader 617 may be built in the electronic blackboard apparatus 14 or may be externally attached to the electronic blackboard apparatus 14. Note that the IC card 630 may be built in a smart device such as a smartphone. Furthermore, the electronic blackboard apparatus 14 may use any other device than the RF tag reader 617 as long as identification information capable of identifying a user can be acquired, and the electronic blackboard apparatus 14 may use a biometric authentication device (for detecting a fingerprint, a palm print, the iris, and the face, etc.), and a barcode reading device.

The electronic blackboard apparatus 14 in FIG. 3 includes a bus line 620 such as an address bus and a data bus for electrically connecting the CPU 601, the ROM 602, the RAM 603, the SSD 604, the network controller 605, the external storage controller 606, the capture device 611, the GPU 612, the sensor controller 614, the electronic pen controller 616, and the RF tag reader 617. Note that the program for the electronic blackboard apparatus 14 may be recorded in and distributed by a computer-readable recording medium such as a Compact Disk Read-Only Memory (CD-ROM).

<Software Configuration-First Embodiment>

Figure 4:
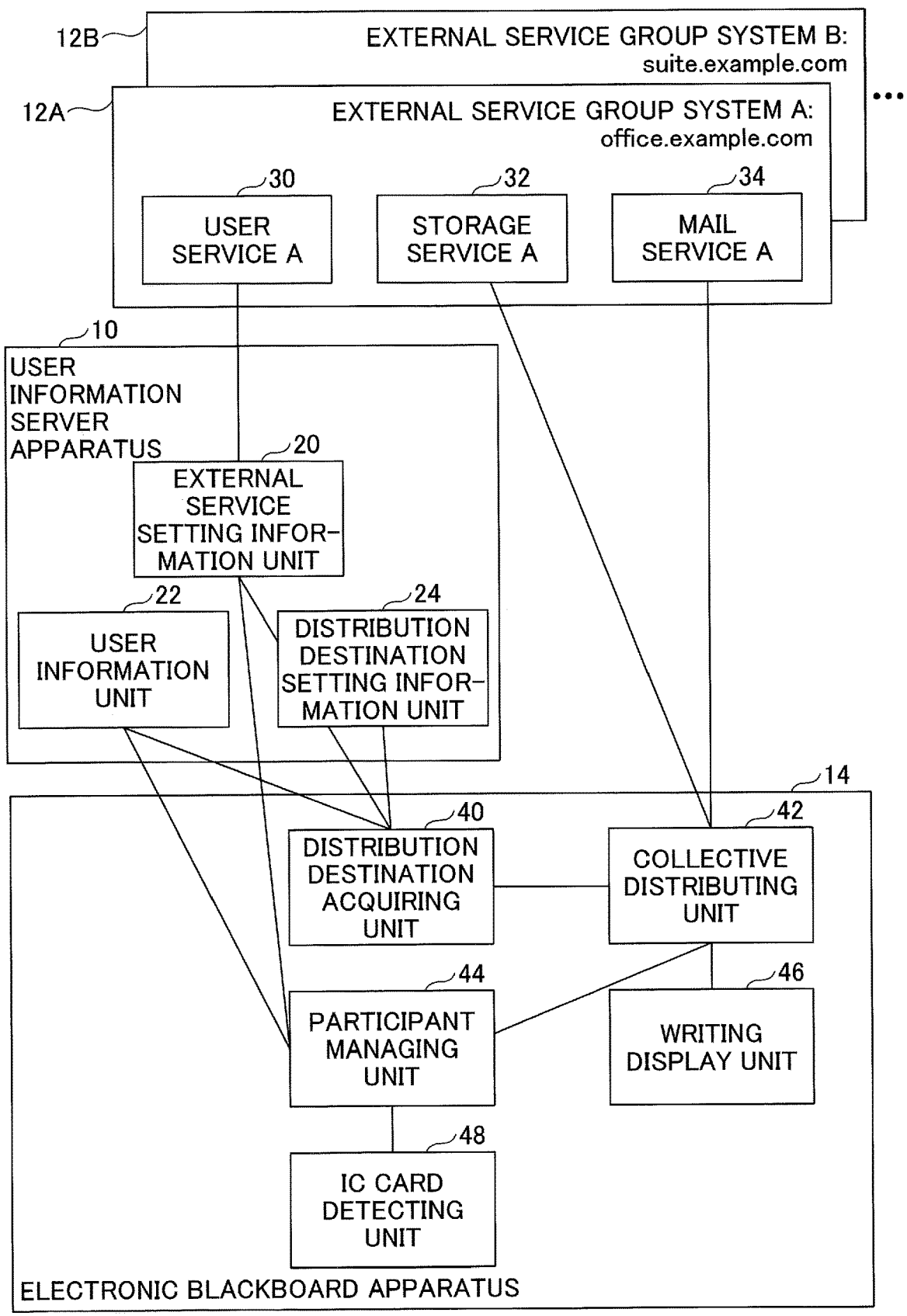
FIG. 4 is a functional configuration diagram of an example of the information processing system according to the first embodiment of the present invention.

The information processing system 1 according to the first embodiment is implemented by, for example, a functional configuration illustrated in FIG. 4. FIG. 4 is a functional configuration diagram of an example of the information processing system according to the first embodiment. In the functional configuration of FIG. 4, configurations unnecessary for the description of the present embodiment are appropriately omitted.

The information processing system 1 in FIG. 4 has a configuration including the user information server apparatus 10, the external service group systems 12A and 12B, and the electronic blackboard apparatus 14. In FIG. 4, as examples of the external service group systems 12, the external service group system 12A "office.example.com" and the external service group system 12B "suite.example.com" are illustrated.

The external service group system 12A exemplifies a user service 30, a storage service 32, and a mail service 34 as an external service group to be provided to the user. The external service group system 12B also provides a similar external service group to the user.

The user service 30 of the external service group system 12A and the user service 30 of the external service group system 12B store user service account information as illustrated in FIGS. 5A and 5B, for example. FIGS. 5A and 5B are configuration diagrams of an example of user service account information. As illustrated in FIGS. 5A and 5B, the user services 30 of the external service group systems 12A and 12B each store the user ID, the name, and the e-mail address as the user service account information.

The storage service 32 is a storage capable of storing a file of a user, and manages the type and the name, etc., of a file or folder for each user, for example, as storage service storage information of FIGS. 6A and 6B. FIGS. 6A and 6B are configuration diagrams of an example of storage service storage information. As illustrated in FIGS. 6A and 6B, the storage services 32 of the external service group systems 12A and 12B each store the user ID of the owner user, the type of the file or folder, and the name, as the storage service storage information.

The mail service 34 manages an e-mail address for each user and provides a mail function to the user. The mail service 34 stores an electronic mail addressed to the user's e-mail address.

The user information server apparatus 10 includes an external service setting information unit 20, a user information unit 22, and a distribution destination setting information unit 24. The user information unit 22 stores the user information list illustrated in FIG. 7, for example. FIG. 7 is a configuration diagram of an example of a user information list. As illustrated in FIG. 7, in the user information list, a user ID, a name, an e-mail address, a distribution destination setting ID, an external service setting ID, and identification information are stored.

The distribution destination setting ID is information for identifying the distribution destination setting information to be described later. The external service setting ID is information for identifying external service setting information to be described later. The identification information is identification information unique to the IC card 630. According to the user information list in FIG. 7, external service setting information and distribution destination setting information of the user, identified by the user ID, are identified. Furthermore, identification information that can be read from the IC card 630 of the user, identified by the user ID, is identified.

The external service setting information unit 20 stores external service setting information as illustrated in FIG. 8, for example. FIG. 8 is a configuration diagram of an example of external service setting information. The external service setting information illustrated in FIG. 8 is different setting information for each user for using the external service group systems 12A and 12B. In the external service setting information, the external service setting ID, the user ID, the address information, the user ID of the external service, and the authentication token of the external service, are stored.

The address information and the user ID of the external service are examples of the connection information to the external service group system 12A or 12B. The authentication token of the external service is an example of the authentication information of the external service group system 12A or 12B.

The distribution destination setting information unit 24 stores distribution destination setting information as illustrated in FIG. 9, for example. FIG. 9 is a configuration diagram of one example of distribution destination setting information. In the distribution destination setting information illustrated in FIG. 9, a distribution destination associated with the user is set. In the distribution destination setting information, a distribution destination setting ID, a transmission destination list, and a file storage destination are stored. The transmission destination list of FIG. 9 includes identification information of an external service such as the storage service 32 or the mail service 34 used as a distribution destination. The file storage destination is the identification information of the file storage destination when the storage service 32 is used as the distribution destination.

The electronic blackboard apparatus 14 includes a distribution destination acquiring unit 40, a collective distributing unit 42, a participant managing unit 44, a writing display unit 46, and an IC card detecting unit 48. The IC card detecting unit 48 reads the identification information from the detected IC card 630 of the user. The participant managing unit 44 manages participants in the meeting in a participant management information list as illustrated in FIG. 10, for example.

FIG. 10 is a configuration diagram of an example of a participant management information list. The participant management information list stores the user ID of the participant. For example, the participant managing unit 44 identifies the user information from the user information list of FIG. 7 by using the identification information read by the IC card detecting unit 48, and stores the user ID of the identified user information as the participant's user ID, in the participant management information list.

The writing display unit 46 accepts writing by the user on the electronic blackboard apparatus 14 and displays the content of the writing. The distribution destination acquiring unit 40 acquires, from the user information server apparatus 10, the external service setting information of FIG. 8 and the distribution destination setting information of FIG. 9, for collectively distributing the image data of the content displayed by the electronic blackboard apparatus 14, to the participants managed by the participant managing unit 44, and provides the acquired information to the collective distributing unit 42. The collective distributing unit 42 collectively distributes the image data of the content displayed by the electronic blackboard apparatus 14, to the participants of the meeting, in accordance with the user information list of FIG. 7, the external service setting information of FIG. 8 and the distribution destination setting information of FIG. 9.

For example, when "storage" is set as the distribution destination list for a participant, the collective distributing unit 42 stores the image data of the content displayed by the electronic blackboard apparatus 14, in the storage service 32 that can be used with the user account of the participant. Furthermore, when "mail" is set as the distribution destination list for a participant, the collective distributing unit 42 attaches the image data of the content displayed by the electronic blackboard apparatus 14 to an e-mail in which the e-mail address of the participant is set as the destination, and transmits the e-mail to which the image data is attached.

<Processing-First Embodiment>

The information processing system 1 according to the first embodiment implements a meeting by using the electronic blackboard apparatus 14 by the following procedures, for example. Here, as a basic usage example, a case where participants are registered at a meeting using the electronic blackboard apparatus 14, and image data of the content displayed by the electronic blackboard apparatus 14 is collectively distributed to the participants of the meeting is explained.

Figure 11:
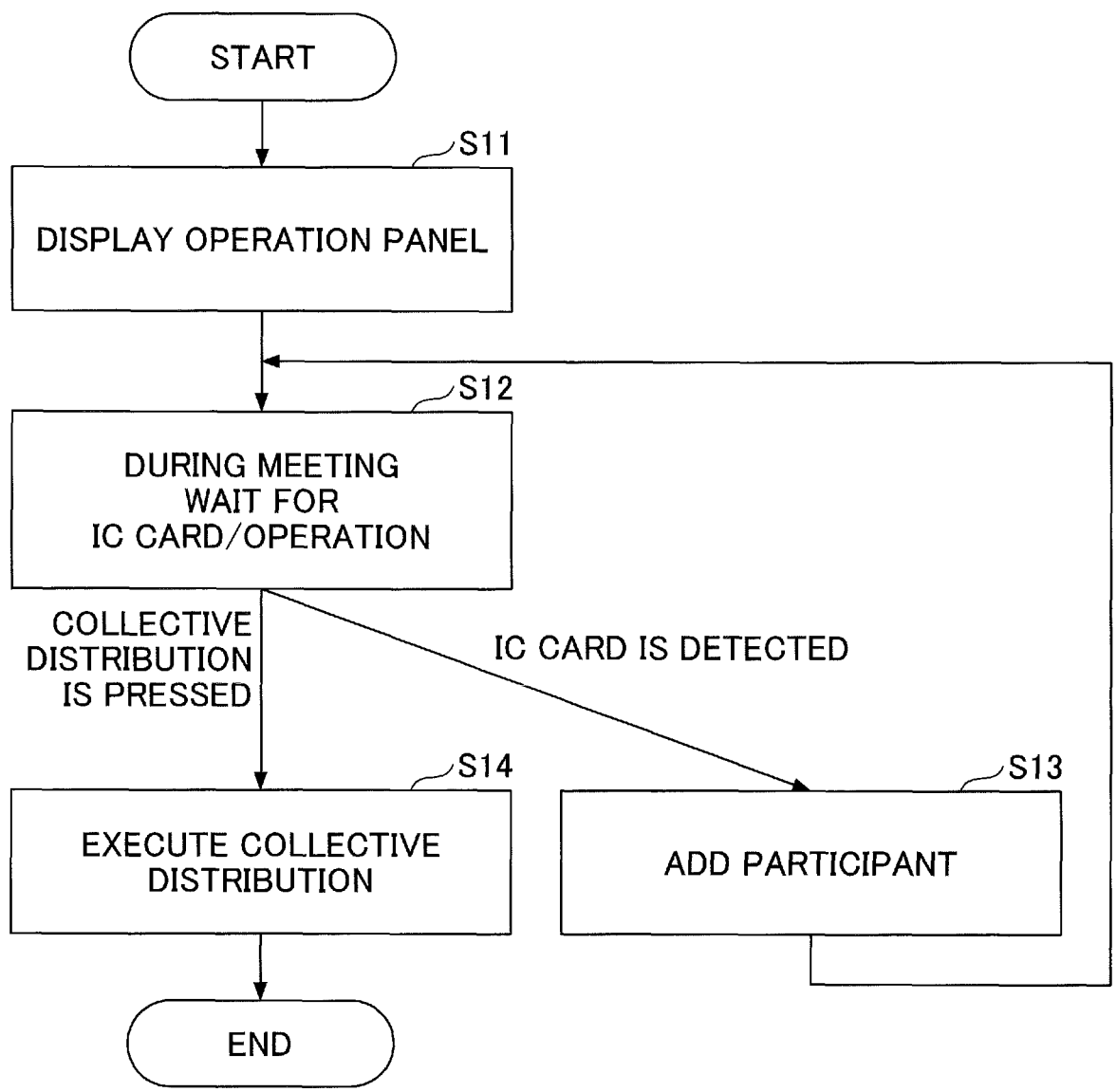
FIG. 11 is a flowchart of an example of a meeting flow using an electronic blackboard according to the first embodiment of the present invention.
Figure 12:
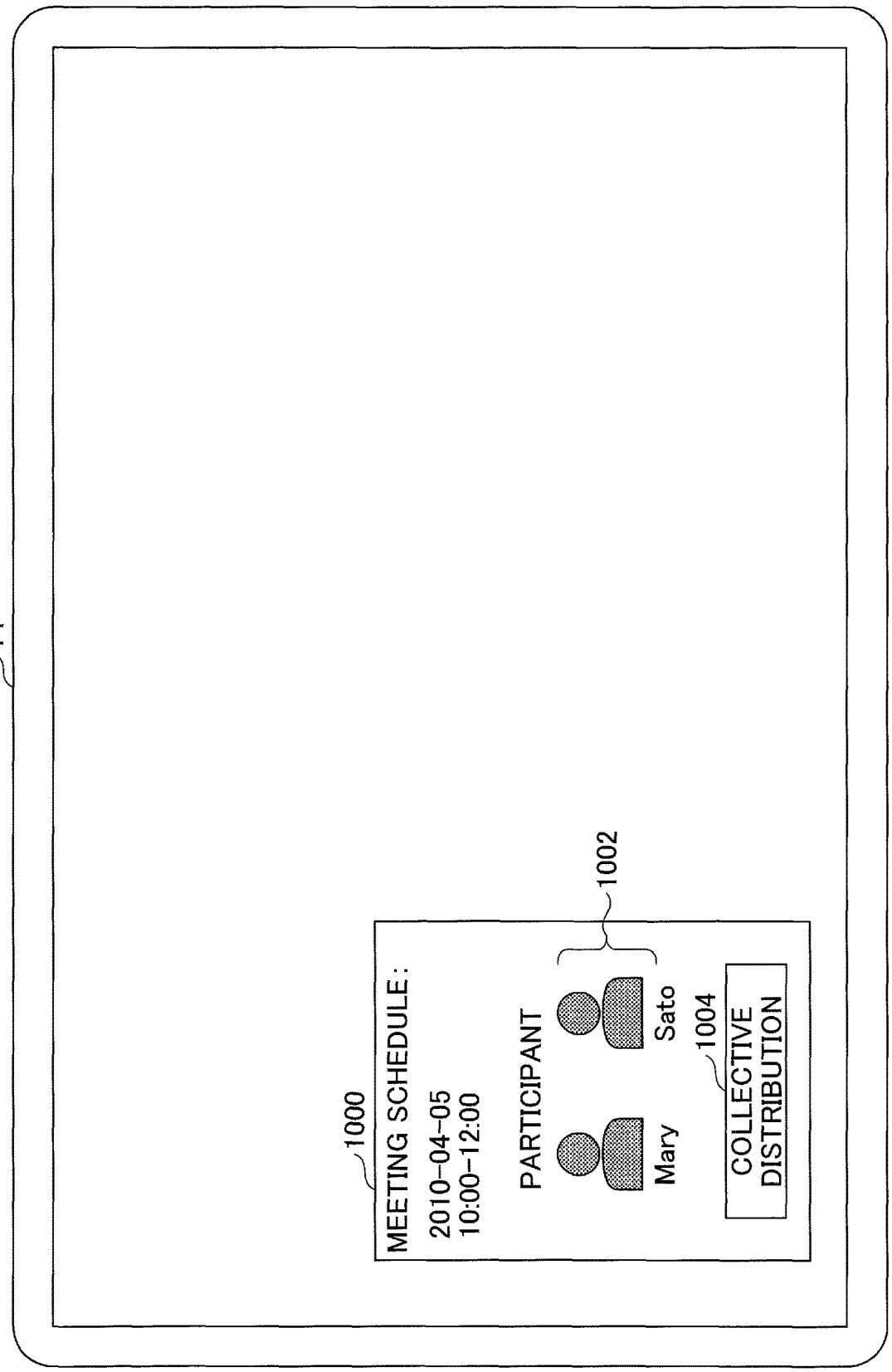
FIG. 12 is an image diagram of an example of an electronic blackboard apparatus on which an operation panel is displayed according to the first embodiment of the present invention.

FIG. 11 is a flowchart of an example of a meeting flow using an electronic blackboard. The process proceeds to step S11, and the electronic blackboard apparatus 14 displays an operation panel 1000 as illustrated in FIG. 12, for example, by the operation of the user who starts the meeting. FIG. 12 is an image diagram of an example of the electronic blackboard apparatus on which the operation panel is displayed. In the operation panel 1000 of FIG. 12, a participant list 1002 and a collective distribution button 1004 are displayed. The user displayed in the participant list 1002 is managed as a participant of the meeting and becomes the distribution target of the image data of the content displayed by the electronic blackboard apparatus 14.

In step S12, during the meeting, the electronic blackboard apparatus 14 accepts an operation such as writing by the user on the electronic blackboard apparatus 14, and updates the content of the display. When the IC card detecting unit 48 detects the IC card 630, the participant managing unit 44 proceeds to step S13, identifies the user from the identification information read from the IC card 630, manages the user as a participant in the meeting, and adds the participant to the participant list 1002. Upon detecting the depression of the collective distribution button 1004, the collective distributing unit 42 proceeds to step S14 to collectively distribute the image data of the content displayed by the electronic blackboard apparatus 14 to the participants in the meeting.

Figure 13:
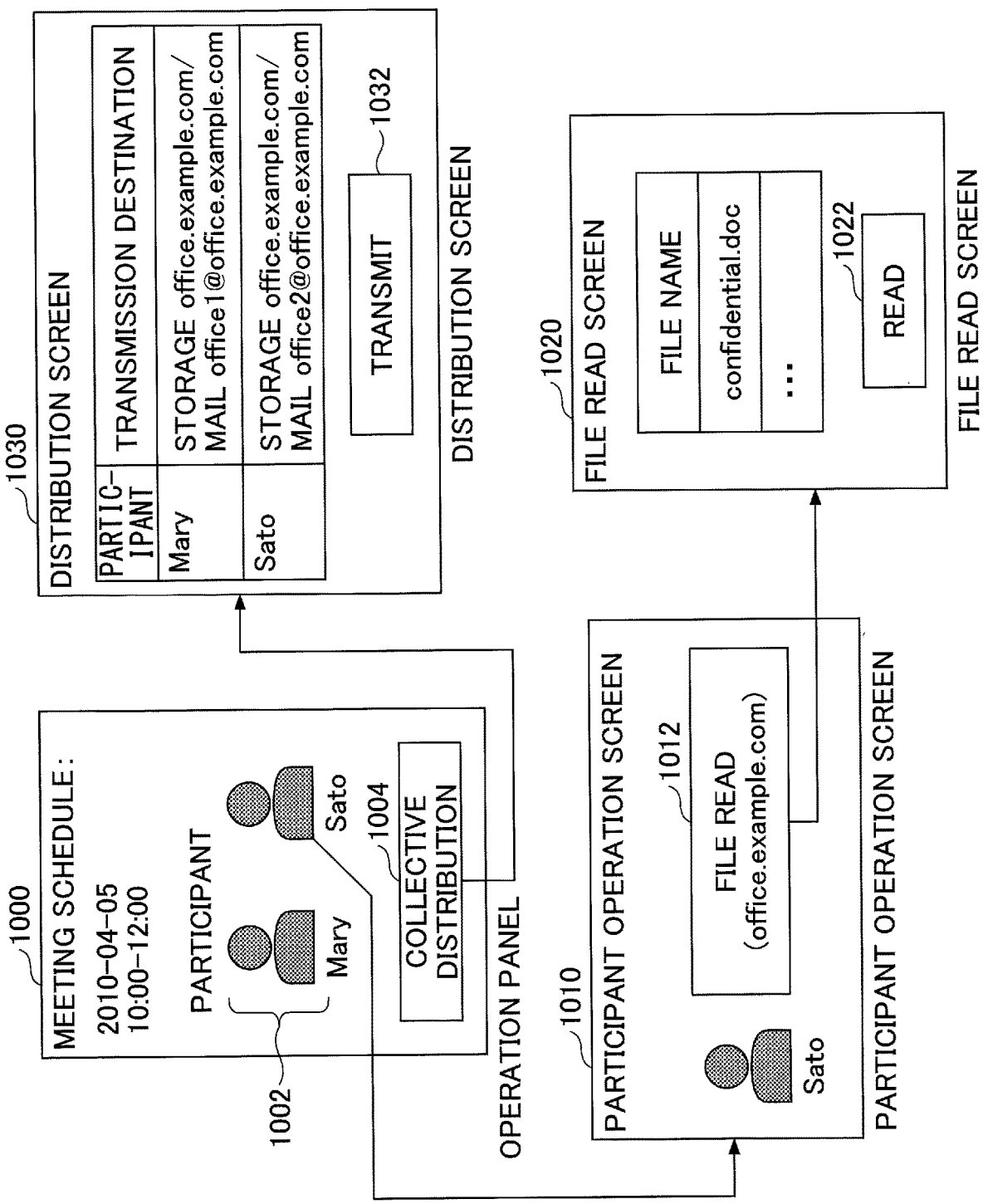
FIG. 13 is an image diagram of an example of a user interface (UI) screen displayed on the electronic blackboard apparatus by operating the operation panel according to the first embodiment of the present invention.

By operating the operation panel 1000, for example, a UI screen as illustrated in FIG. 13 is displayed on the electronic blackboard apparatus 14. FIG. 13 is an image diagram of an example of a UI screen displayed on the electronic blackboard apparatus by operating the operation panel.

As illustrated in FIG. 13, when the collective distribution button 1004 is pressed, a distribution screen 1030 is displayed on the electronic blackboard apparatus 14. On the distribution screen 1030, a transmission destination for each participant and a transmit button 1032 are displayed. The distribution screen 1030 allows the user to confirm the transmission destination for each participant. Furthermore, by pressing the transmit button 1032, the user can cause the electronic blackboard apparatus 14 to collectively distribute the image data of the content displayed by the electronic blackboard apparatus 14.

Furthermore, as illustrated in FIG. 13, upon accepting an operation of selecting one participant from the participant list 1002, the electronic blackboard apparatus 14 displays the participant operation screen 1010. In the participant operation screen 1010, a file read button 1012 is displayed. The user can cause the electronic blackboard apparatus 14 to display a file read screen 1020 by pressing the file read button 1012. In the file read screen 1020, a list of files that can be read with the authority of the participant selected from the participant list 1002 and a read button 1022, are displayed. By pressing the read button 1022, the user can read the file selected from the file read screen 1020 and load the file into the electronic blackboard apparatus 14.

Figure 14:
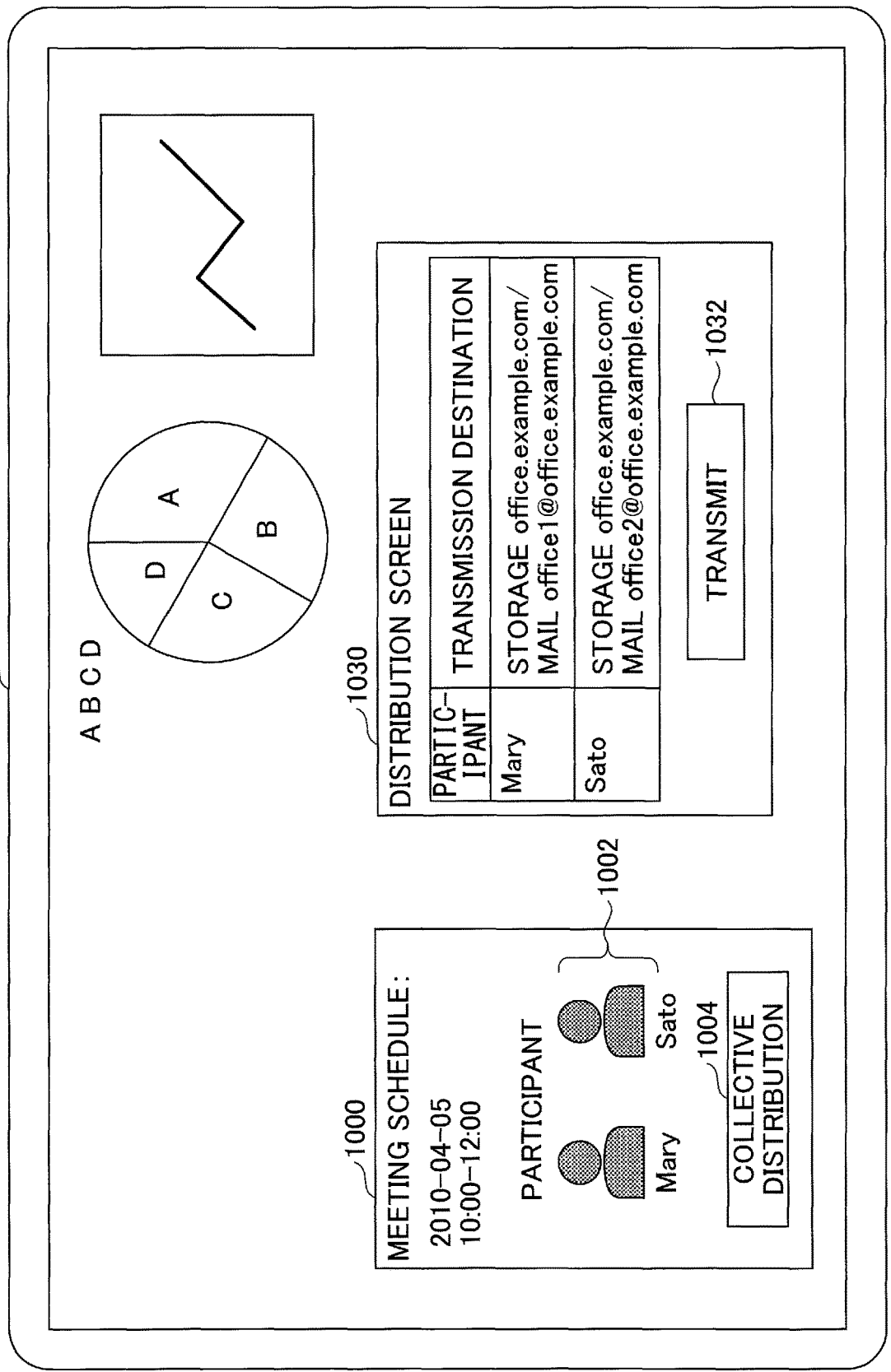
FIG. 14 is an image diagram of an example of an electronic blackboard apparatus on which a distribution screen is displayed by operating the operation on an operation panel according to the first embodiment of the present invention.

The distribution screen 1030 illustrated in FIG. 13 is displayed on the electronic blackboard apparatus 14 as illustrated in FIG. 14, for example. FIG. 14 is an image diagram of an example of the electronic blackboard apparatus on which the distribution screen is displayed by operating the operation panel. As illustrated in FIG. 14, the distribution screen 1030 may be displayed side by side with the operation panel 1000, or may be displayed after hiding the operation panel 1000.

Figure 15:
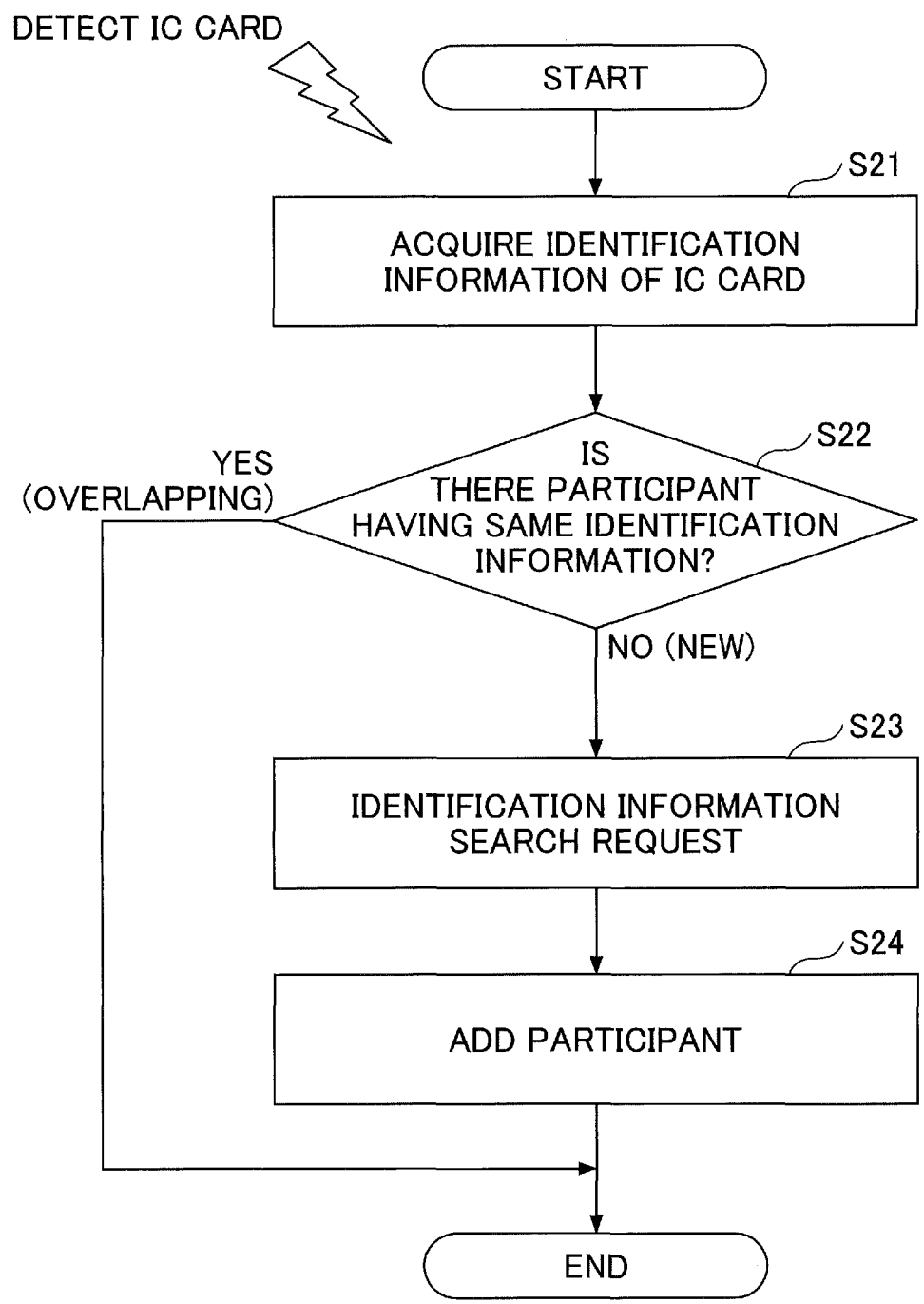
FIG. 15 is a flowchart of an example of a process of adding participants in a meeting according to the first embodiment of the present invention.

In step S13 of FIG. 11, for example, a process of adding a participant of the meeting is performed by the procedures illustrated in FIG. 15. FIG. 15 is a flowchart of an example of a process of adding a participant in a meeting. FIG. 15 illustrates a process after the IC card detecting unit 48 detects the IC card 630 and reads the identification information from the IC card 630.

Proceeding to step S21, the participant managing unit 44 acquires the identification information read from the IC card 630 by the IC card detecting unit 48. Proceeding to step S22, the participant managing unit 44 refers to the user information list illustrated in FIG. 7, and determines whether there is a user having the same identification information among the participants.

When there is no user having the same identification information among the participants, the participant managing unit 44 proceeds to step S23 and identifies the user of the identification information acquired in step S21 from the user information list illustrated in FIG. 7. Proceeding to step S24, the participant managing unit 44 manages the identified user as a participant and adds the identified user to the participant list 1002. Note that when there is a user having the same identification information among the participants, the participant managing unit 44 skips steps S23 and S24.

For example, upon detecting the IC card 630 of "Mary Smith" illustrated in the user information list of FIG. 7, the IC card detecting unit 48 reads the identification information "ICCARD-123" from the IC card. In step S21, the participant managing unit 44 acquires the identification information "ICCARD-123" from the IC card detecting unit 48. Proceeding to step S22, when a user having the same identification information "ICCARD-123" has not yet been managed as a participant, the participant managing unit 44 proceeds to step S24. By adding the user ID "user001" to the participant management information list as illustrated in FIG. 10, the participant managing unit 44 can manage the user of the identification information acquired in step S21 as a participant in the meeting, and add the user to the participant list 1002.

Figure 16:
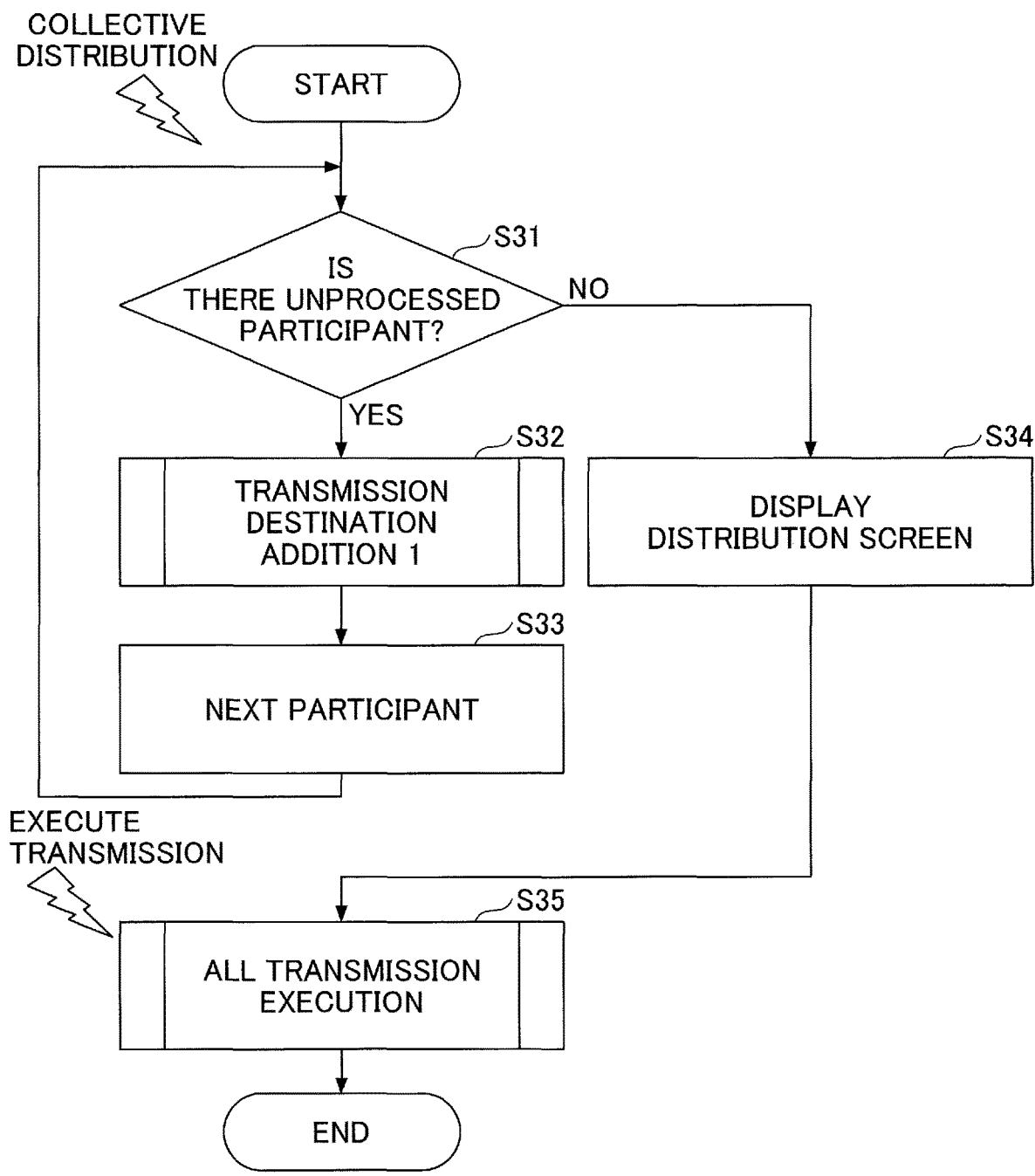
FIG. 16 is a flowchart of an example of a collective distribution process according to the first embodiment of the present invention.

In step S14 of FIG. 11, for example, by the procedures illustrated in FIG. 16, collective distribution of the image data of the content displayed by the electronic blackboard apparatus 14 to participants in the meeting, is executed. FIG. 16 is a flowchart of an example of the collective distribution process. Upon detecting the depression of the collective distribution button 1004, the collective distributing unit 42 performs a transmission destination addition process of step S32, with respect to all of the participants managed in the participant management information list acquired from the participant managing unit 44 in steps S31 to S33.

When the transmission destination addition process of step S32 is finished for all of the participants, the collective distributing unit 42 proceeds to step S34 and displays the distribution screen 1030. When the transmit button 1032 is pressed, the collective distributing unit 42 proceeds to step S35, and in accordance with the result of the transmission destination addition process in step S32, an all transmission execution process of distributing the image data of the content displayed by the electronic blackboard apparatus 14 to the transmission destinations associated with the participants, is performed.

Figure 17:
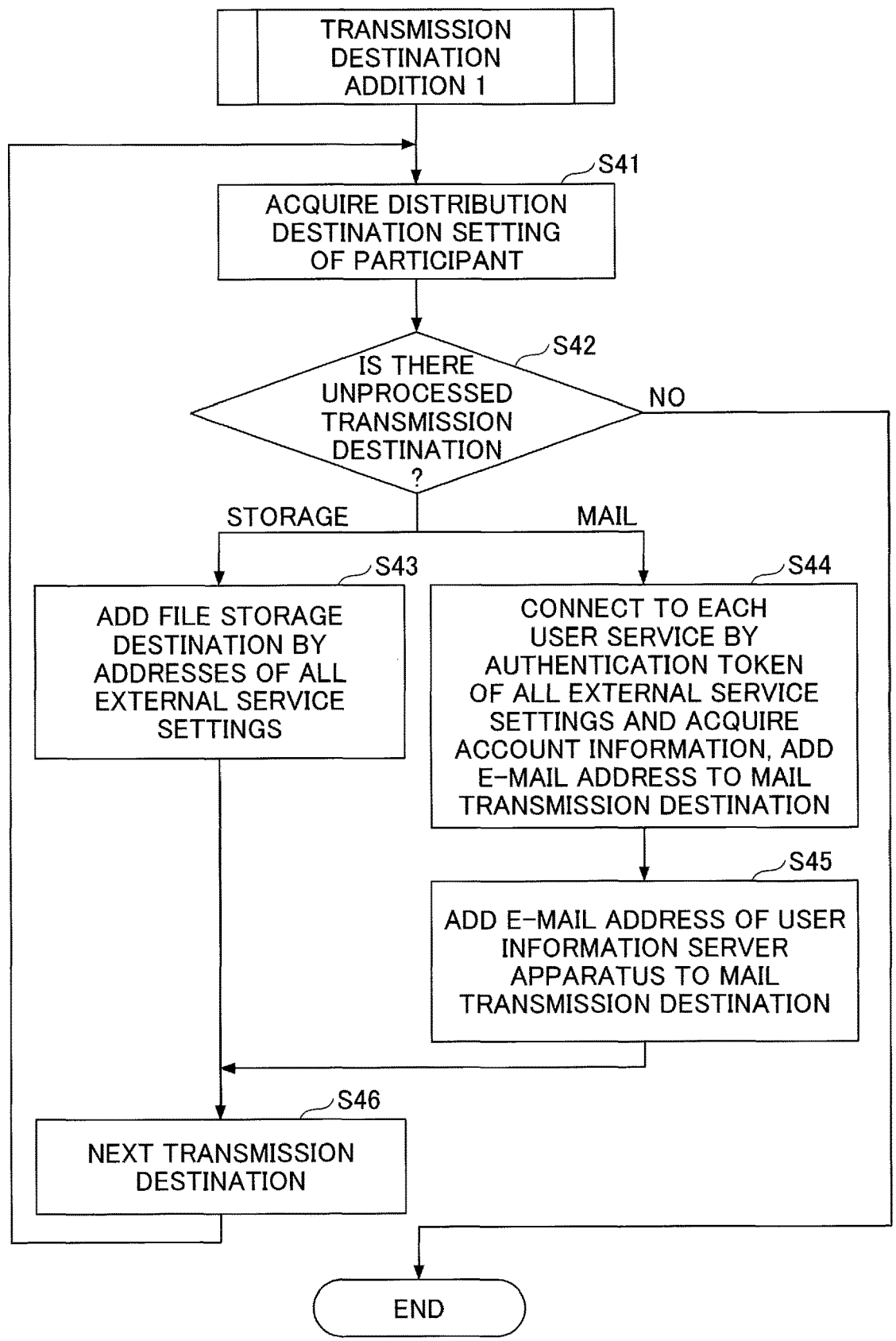
FIG. 17 is a flowchart of an example of a transmission destination addition process according to the first embodiment of the present invention.

In step S32 of FIG. 16, for example, a destination addition process is performed by the procedures illustrated in FIG. 17. FIG. 17 is a flowchart of an example of a transmission destination addition process. The transmission destination addition process illustrated in FIG. 17 is performed for all participants included in the participant management information list.

In step S41, the collective distributing unit 42 specifies a participant included in the participant management information list, and requests the distribution destination acquiring unit 40 to perform a transmission destination addition process. The distribution destination acquiring unit 40 acquires the distribution destination setting information of the specified participant from the distribution destination setting information unit 24. The distribution destination acquiring unit 40 repeats the processes of steps S41 to S46 for the types of the transmission destinations such as storage or mail indicated in the transmission destination list of the distribution destination setting information.

Proceeding to step S42, the distribution destination acquiring unit 40 determines whether there is an unprocessed transmission destination type among the transmission destination types such as storage or mail indicated in the transmission destination list of the distribution destination setting information, and when the unprocessed transmission destination type is storage, the process proceeds to step S43.

In step S43, the distribution destination acquiring unit 40 generates a file storage destination address based on the address information of all pieces of external service setting information and the file storage destination of the distribution destination setting information of the specified participant, and adds the file storage destination address as the transmission destination of the specified participant.

Furthermore, the distribution destination acquiring unit 40 determines whether there is an unprocessed transmission destination type among the transmission destination types such as storage or mail indicated in the transmission destination list of the distribution destination setting information, and when the unprocessed transmission destination type is mail, the process proceeds to step S44.

In step S44, the distribution destination acquiring unit 40 acquires the user service account information of the specified participant from the user service 30 by using an authentication token of the external service of all pieces of external service setting information of the specified participant. Then, the distribution destination acquiring unit 40 adds the e-mail address of the acquired user service account information as the transmission destination of the specified participant.

Furthermore, in step S45, the distribution destination acquiring unit 40 acquires the e-mail address of the specified participant from the user information list, and adds the e-mail address as the transmission destination of the specified participant.

Here, the processes of steps S43 to S45 will be specifically described by taking the user information list of FIG. 7, the external service setting information of FIG. 8, and the distribution destination setting information of FIG. 9 as examples. The collective distributing unit 42 specifies the participant "user001" included in the participant management information list and requests the distribution destination acquiring unit 40 to perform a transmission destination addition process. The distribution destination acquiring unit 40 acquires distribution destination setting information corresponding to the distribution destination setting ID "setting1" of the specified participant "user 001", from the distribution destination setting information unit 24. In the transmission destination list of the distribution destination setting information of the distribution destination setting ID "setting1", the transmission destination type "storage" is indicated.

The distribution destination acquiring unit 40 acquires the external service setting information corresponding to the external service setting ID "connect1a" of the specified participant "user 001", from the external service setting information unit 20. The distribution destination acquiring unit 40 combines the address information "office.example.com" of the external service setting information of the external service setting ID "connect1a" with the file storage destination "/Folder1" of the distribution destination setting information of the distribution destination setting ID "setting1", and generates a file storage destination address "office.example.com/Folder1". The distribution destination acquiring unit 40 adds the generated file storage destination address to the transmission destinations in the distribution screen 1030 as the transmission destination of the specified participant "user 001".

Furthermore, the distribution destination acquiring unit 40 specifies the participant "user002" included in the participant management information list and requests the distribution destination acquiring unit 40 to perform a transmission destination addition process. The distribution destination acquiring unit 40 acquires distribution destination setting information corresponding to the distribution destination setting ID "setting2" of the specified participant "user002", from the distribution destination setting information unit 24. "Storage" and "mail" are indicated as the transmission destination type in the transmission destination list of the distribution destination setting information of the distribution destination setting ID "setting2".

The process for the transmission destination type "storage" is performed in the same manner as for the above-described participant "user001", and the generated file storage destination address "suite.example.com/Weekly-Meeting" is added to the transmission destinations in the distribution screen 1030 as the transmission destination of the specified participant "user002".

Furthermore, the process for the transmission destination type "mail" is performed as follows. The distribution destination acquiring unit 40 acquires the external service setting information corresponding to the external service setting ID "connect2b" of the specified participant "user002" from the external service setting information unit 20. By using the authentication token "eyJhbGc12 . . . " of the external service of the external service setting information of the external service setting ID "connect2b", the distribution destination acquiring unit 40 acquires the user service account information of the user ID "suite2" of the external service, from the user service 30 of the address information "suite.example.com". The distribution destination acquiring unit 40 reads the e-mail address "suite2@suite.example.com" from the user service account information of the user ID "suite2" of the external service, and adds this e-mail address to the transmission destinations in the distribution screen 1030 as the transmission destination of the specified participant "user002".

Furthermore, the distribution destination acquiring unit 40 reads the e-mail address "sato@intra.example.com" from the user information of the specified participant "user002", and adds the e-mail address to the transmission destinations in the distribution screen 1030 as the transmission destination of the specified participant "user002".

In this manner, in the transmission destination addition process illustrated in FIG. 17, distribution destination setting information of the specified participant is acquired, and a specific destination (file storage destination address and e-mail address) is returned to the collective distributing unit 42, for each transmission destination type (storage and mail, etc.).

Figure 18:
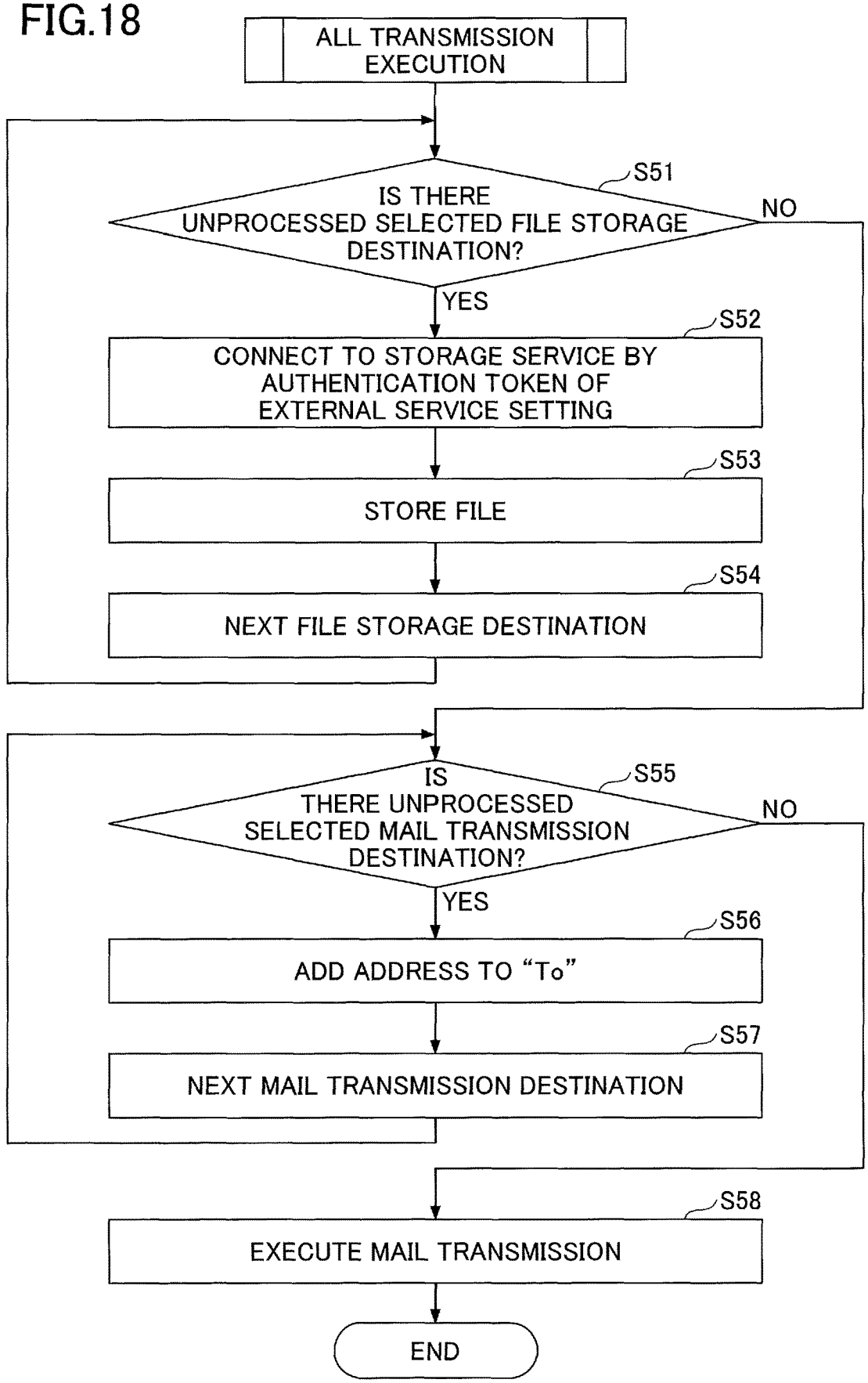
FIG. 18 is a flowchart of an example of an all transmission execution process according to the first embodiment of the present invention.

In step S35 of FIG. 16, for example, the all transmission execution process is performed by the procedures illustrated in FIG. 18. FIG. 18 is a flowchart of an example of the all transmission execution process. In the all transmission execution process of FIG. 18, according to the result of the transmission destination addition process of FIG. 17, the image data of the content displayed by the electronic blackboard apparatus 14 is distributed to the transmission destinations associated with the participants.

The collective distributing unit 42 repeats the processes of steps S51 to S54 for all of the file storage destination addresses included in the transmission destinations in the distribution screen 1030, as a result of the transmission destination addition process in FIG. 17. Proceeding to step S52, the collective distributing unit 42 connects to the storage service 32 of the external service group system 12 with the authentication token of the external service of the external service setting information corresponding to the unprocessed file storage destination address. In step S53, the collective distributing unit 42 stores the image data of the content displayed by the electronic blackboard apparatus 14 in the connected storage service 32.

After saving the image data for all of the file storage destination addresses included in the transmission destinations in the distribution screen 1030 as a result of the transmission destination addition process in FIG. 17, the collective distributing unit 42 proceeds to step S55. The collective distributing unit 42 repeats the processes of steps S55 to S57 for all of the e-mail addresses included in the transmission destinations in the distribution screen 1030 as a result of the transmission destination addition process of FIG. 17, whereby each e-mail address is added to the destination field (To) of the e-mail for transmitting the image data of the content displayed by the electronic blackboard apparatus 14. In step S58, the collective distributing unit 42 transmits the e-mail for transmitting the image data of the content displayed by the electronic blackboard apparatus 14, in which all e-mail addresses included in the transmission destinations in the distribution screen 1030 have been added.

In this manner, in the all transmission execution process illustrated in FIG. 18, it is possible to collectively perform storage of a file in the file storage destination of the storage service 32 of the external service group system 12 that is different for each participant, and transmission of a file to the e-mail addresses of the mail service 34.

As described above, according to the first embodiment, when distributing the image data of the content displayed by the electronic blackboard apparatus 14 to the participants in the meeting, it is possible to reduce the labor of selecting the storage service 32 and the mail service 34 of the external service group system 12 for which settings for usage are necessary of each user.

Second Embodiment

In the first embodiment, an example is illustrated in which one external service setting ID of the user information list is set for each participant. In a second embodiment, a description is given of an example of a participant for which two external service setting IDs in the user information list are set. The second embodiment is the same as the first embodiment except for some parts, and, therefore, descriptions of the same parts will be omitted as appropriate.

Here, a description is given of an example in which a participant with a user ID "user002" holds user service account information of the external service group system 12A, in addition to the user service account information of the external service group system 12B. FIG. 19 is a configuration diagram of an example of the user service account information according to the second embodiment. FIG. 20 is a configuration diagram of an example of the user information list according to the second embodiment.

FIG. 21 is a configuration diagram of an example of external service setting information according to the second embodiment.

The user service account information in FIG. 19 illustrates an example in which the user service account information of the participant with the user ID "user002" is added to the user service account information in FIG. 5A. The user information list in FIG. 20 illustrates an example in which the external service setting ID "connect2a" of the participant with the user ID "user 002" is added to the user information list in FIG. 7. The external service setting information of FIG. 21 illustrates an example in which the external service setting information of the participant with the user ID "user002" is added to the external service setting information of FIG. 8.

In the example of the user information list of FIG. 20, two external service setting IDs "connect2a" and "connect2b" are set as the external service setting IDs of the participant with the user ID "user002". Therefore, in the second embodiment, in addition to the transmission destination of the participant of the first embodiment, the storage service 32 and the mail service 34 of the external service group system 12B are selected as the transmission destinations of the participant with the user ID "user002".

Figure 22:
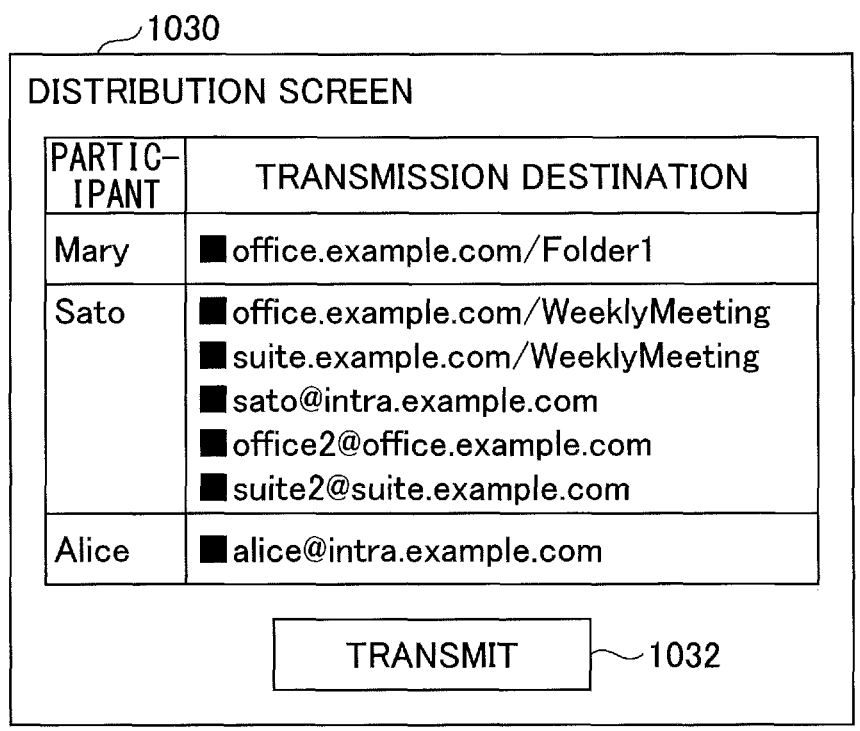
FIG. 22 is an image diagram of an example of a distribution screen according to the second embodiment of the present invention.

In the second embodiment, for example, a transmission destination to be the target of the all transmission execution process of step S35 may be selected from the transmission destinations displayed in the distribution screen 1030, as in the distribution screen 1030 of FIG. 22.

FIG. 22 is an image diagram of an example of a distribution screen according to the second embodiment. In the distribution screen 1030 of FIG. 22, the mark "■" before the transmission destination represents a transmission destination to a target of the all transmission execution process, and by changing the mark to a mark "☐" by tapping the screen, etc., the transmission destination can be excluded from the transmission destinations that are targets of the all transmission execution process.

Third Embodiment

The external service group system 12 described in the first and second embodiments may include a schedule service. The schedule service manages the user's action schedule and meeting schedule. Such a schedule service includes information on the scheduled attendees of the meeting as meeting schedule information. Therefore, in a third embodiment, a scheduled attendee of the meeting is set in the schedule service of the external service group system 12, and the scheduled attendee is set as a target of the all transmission execution process.

Figure 23:
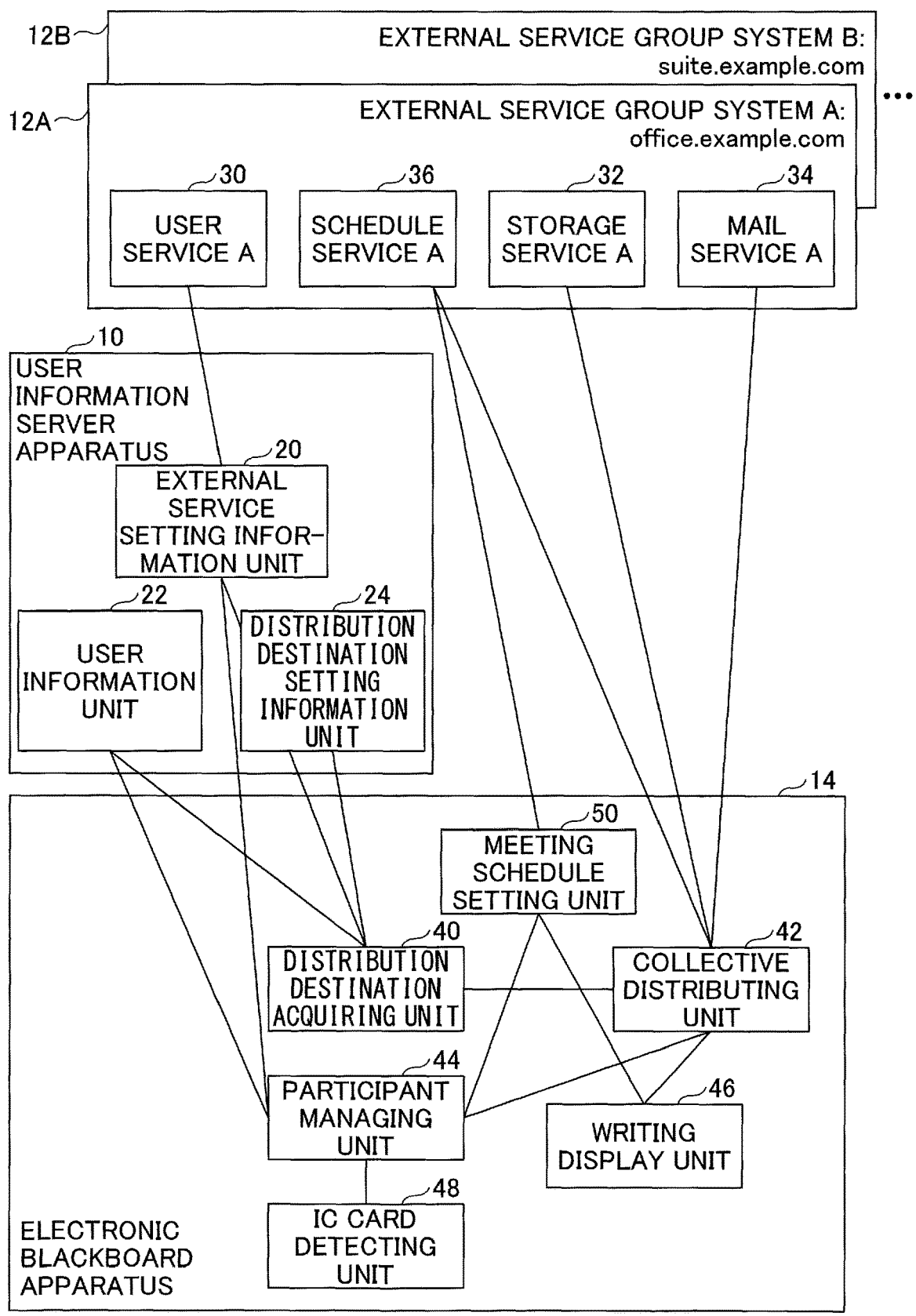
FIG. 23 is a functional configuration diagram of an example of the information processing system according to a third embodiment of the present invention.

FIG. 23 is a functional configuration diagram of an example of the information processing system according to the third embodiment. In the functional configuration of FIG. 23, a schedule service 36 and a meeting schedule setting unit 50 are added to the functional configuration of FIG. 4. The schedule service 36 is added to the external service group system 12A. Furthermore, the meeting schedule setting unit 50 is added to the electronic blackboard apparatus 14.

In the schedule service 36, schedule service schedule information as illustrated in FIG. 24, for example, is stored. FIG. 24 is a configuration diagram of an example of schedule service schedule information according to the third embodiment. As illustrated in FIG. 24, in the schedule service 36, the schedule ID, the schedule type, the owner user, the start time and period, the scheduled attendee, and the attached file, are stored as schedule service schedule information. In the schedule service schedule information illustrated in FIG. 24, the schedule information for user actions and meeting schedule information can be distinguished, according to the schedule type.

The meeting schedule setting unit 50 of the electronic blackboard apparatus 14 includes a user interface for setting the meeting schedule, and communicates with the schedule service 36 of the external service group system 12, so that the schedule type displays the schedule service schedule information of the meeting, for prompting the user to make a selection.

As an outline of the process, after the meeting starts, the meeting schedule setting unit 50 regards a participant who is first detected, as the organizer, and based on schedule service schedule information in which the detected participant is the owner user and the schedule type is meeting, a meeting schedule list is posted for the user. When the user selects a meeting from the meeting schedule list, the electronic blackboard apparatus 14 reads the attached file of the meeting based on the schedule service schedule information, and displays the attached file. Furthermore, the participant managing unit 44 adds the scheduled attendee of the meeting to the participant list 1002 in the operation panel 1000.

When a participant has a plurality of pieces of external service setting information, the collective distributing unit 42 sets the storage service 32 and the mail service 34 of the same external service group system 12A as the schedule service 36 in which the meeting schedule information of the corresponding meeting has been set, as the transmission destinations, and preferentially displays these transmission destinations on the distribution screen 1030. By doing so, in the third embodiment, it is possible to reduce the labor of selecting the transmission destination to be the target of the all transmission execution process of step S35.

Figure 25:
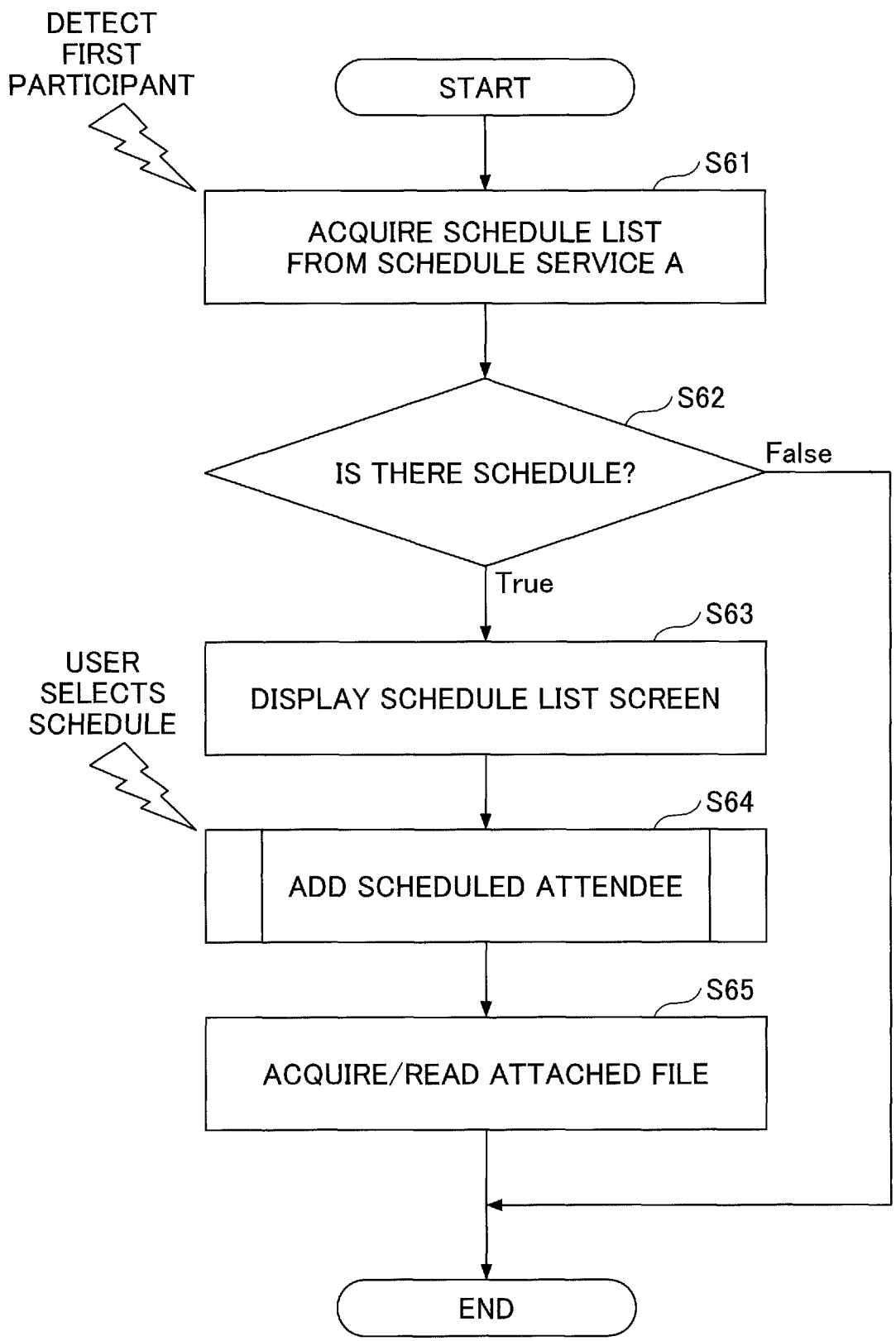
FIG. 25 is a flowchart of an example of a process of setting a meeting schedule according to the third embodiment of the present invention.

FIG. 25 is a flowchart of an example of a process of setting a meeting schedule according to the third embodiment. In the process of setting the meeting schedule of FIG. 25, when the meeting schedule setting unit 50 detects the first participant, the meeting schedule list is posted for the user based on the schedule service schedule information in which the participant is the owner user, and based on a selection by the user, a processing procedure of selecting a transmission destination to be a target of the all transmission execution process of step S35 is performed.

In step S61, the meeting schedule setting unit 50 acquires the meeting schedule list from the schedule service 36 of the external service group system 12A, based on the schedule service schedule information in which the participant detected first is the owner user and the scheduled type is meeting. When there is no meeting schedule (NO in step S62), the meeting schedule setting unit 50 skips steps S63 to S65 and ends the process of the flowchart of FIG. 25.

When there is a meeting schedule (YES in step S62), the meeting schedule setting unit 50 proceeds to step S63, displays a schedule list screen 1040 illustrated in FIG. 28, for example, and prompts the user to select the meeting schedule. FIG. 28 is an image diagram of an example of the schedule list screen according to the third embodiment.

Proceeding to step S64, the meeting schedule setting unit 50 reports the scheduled attendees of the meeting selected by the user to the participant managing unit 44, so that the scheduled attendees of the meeting are added to the participant management information list. Then, the process proceeds to step S65, and the meeting schedule setting unit 50 reads and displays the attached file of the meeting schedule selected by the user.

Figure 26:
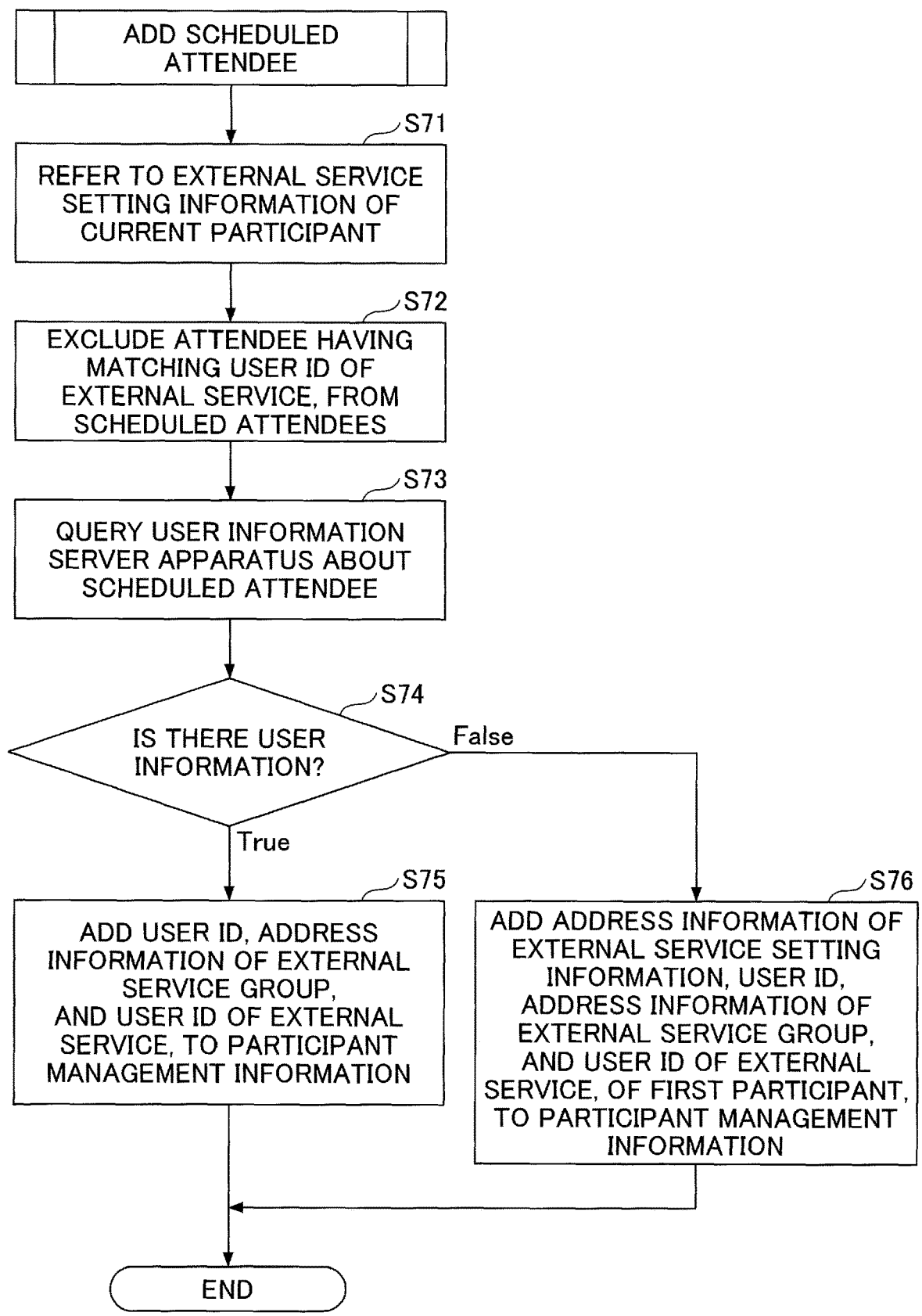
FIG. 26 is a flowchart of an example of a process of adding a scheduled attendee according to the third embodiment of the present invention.

In step S64 of FIG. 25, a scheduled attendee addition process is performed by the procedures illustrated in FIG. 26, for example. FIG. 26 is a flowchart of an example of a process for adding a scheduled attendee. In step S71, the participant managing unit 44 refers to the external service setting information unit 20 for the external service setting information of the participant detected first (current participant).

Proceeding to step S72, the participant managing unit 44 excludes a participant having a user ID that matches that of the current participant, from the scheduled participants of the meeting selected by the user. Proceeding to step S73, the participant managing unit 44 queries the user information unit 22 for the user information corresponding to the user ID of the external service of the scheduled attendee of the meeting.

When there is user information corresponding to the user ID of the external service (YES in step S74), the process proceeds to step S75, and the participant managing unit 44 adds, to the participant management information list of FIG. 29, the user ID and the external service setting information (address information of the external service group system 12, and the user ID of the external service) of the scheduled attendee. When there is no user information corresponding to the user ID of the external service (NO in step S74), the process proceeds to step S76, and the participant managing unit 44 adds, to the participant management information list of FIG. 29, the user ID and the e-mail address of the external service of the scheduled attendee of the meeting. FIG. 29 is a configuration diagram of an example of a participant management information list according to the third embodiment.

Here, the process in the flowcharts of FIGS. 25 and 26 will be specifically described with reference to the schedule service schedule information of FIG. 24, the user service account information of FIG. 27, and the participant management information list of FIG. 29, as an example. The participant with the user ID "user001" who is the organizer of the meeting is detected by the IC card 630.

Here, it is assumed that the user information list of the user ID "user001" indicated in FIG. 7, the external service setting information of the external service setting ID "connect1a" indicated in FIG. 21, and the user service account information of the user ID "office1" indicated in FIG. 27 are acquired, and that the user with the user ID "user001" is set as the first participant in the participant management information list of the participant managing unit 44 illustrated in FIG. 29. FIG. 27 is a configuration diagram of an example of the user service account information according to the third embodiment.

The meeting schedule setting unit 50 receives, from the participant managing unit 44, the user ID "user 001" and the external service setting ID "connect1a" of the participant detected first. Based on the external service setting information of the external service setting ID "connect1a", the meeting schedule setting unit 50 uses the external service authentication token "eyJhbGc11 . . . " to connect to the schedule service 36 of the address information "office.example.com", to acquire the schedule service schedule information of the schedule ID "sch-1" in which the user ID "office1" is set as the owner user.

The meeting schedule setting unit 50 displays the schedule list screen 1040 of FIG. 28 based on the schedule service schedule information of the acquired schedule ID "sch-1", and prompts the user to select a meeting schedule from the schedule list screen 1040. When the user selects a meeting from the schedule list screen 1040 in FIG. 28, the meeting schedule setting unit 50 reports the external service setting ID "connect1a" and the scheduled attendees "office1, office2, and office 3".

The participant managing unit 44 checks the external service setting information of the external service setting ID "connect1a" corresponding to the user ID "user 001" of the participant. The user ID of the external service of the external service setting information is "office1", and, therefore, the participant managing unit 44 deletes "office1" from the reported scheduled attendees "office 1, office 2, and office 3".

The reason why such a process is performed is that the scheduled attendee "office1" is the owner of the referred meeting schedule, and before identifying the scheduled attendees of the meeting schedule, information of this user is already identified.

Next, the participant managing unit 44 queries the user information server apparatus 10 in order to identify the remaining scheduled attendees "office 2 and office 3". The external service setting information unit 20 of the user information server apparatus 10 returns the external service setting ID "connect2a" and the user ID "user002" of the external service setting information having "office2" as the user ID of the external service, based on the external service setting information illustrated in FIG. 21.

Note that with respect to "office 3", the external service setting information unit 20 of the user information server apparatus 10 does not return anything because the external service setting information having "office3" as the user ID of the external service cannot be found in the external service setting information illustrated in FIG. 21.

The participant managing unit 44 adds the external service setting ID "connect2a" and the user ID "user 002" obtained by querying about the user ID "office2" of the external service, as illustrated in the participant management information list of FIG. 29. Furthermore, the participant managing unit 44 cannot obtain anything in response to the query about the user ID "office3" of the external service, and, therefore, the participant managing unit 44 adds the e-mail address "office3@office.example.com" of the mail service 34 of the external service group system 12A set in the user service account information of FIG. 27, as illustrated in the participant management information list in FIG. 29.

In the collective distribution process after the process of setting the meeting schedule of FIG. 25 has ended, when a participant holds a plurality of pieces of external service setting information, the external service group of the external service group system 12 having the used schedule service 36 is preferentially selected as the transmission destination. Accordingly, it is possible to reduce the labor of the user of excluding an external service group having low relevance, from the transmission destination.

Furthermore, when nothing can be obtained, as in the case of querying about the user ID "office3" of the external service, by using the e-mail address of the mail service 34 of the external service group system 12A as the transmission destination, even a user that is not registered in the user information unit 22 can also become the distribution target of the image data of the content displayed by the electronic blackboard apparatus 14. Furthermore, the schedule service 36 may be set as the transmission destination of the image data of the content displayed by the electronic blackboard apparatus 14, as illustrated in the transmission destination list of distribution destination setting information in FIG. 30.

FIG. 30 is a configuration diagram of one example of the distribution destination setting information according to the third embodiment. In the schedule service 36 set in the transmission destination list, for example, the image data of the content displayed by the electronic blackboard apparatus 14 is stored as additional information of the meeting schedule list. Accordingly, it becomes easy to collectively distribute the image data of the content displayed by the electronic blackboard apparatus 14, for example, via the schedule service 36 of the external service group system 12.

Figure 31:
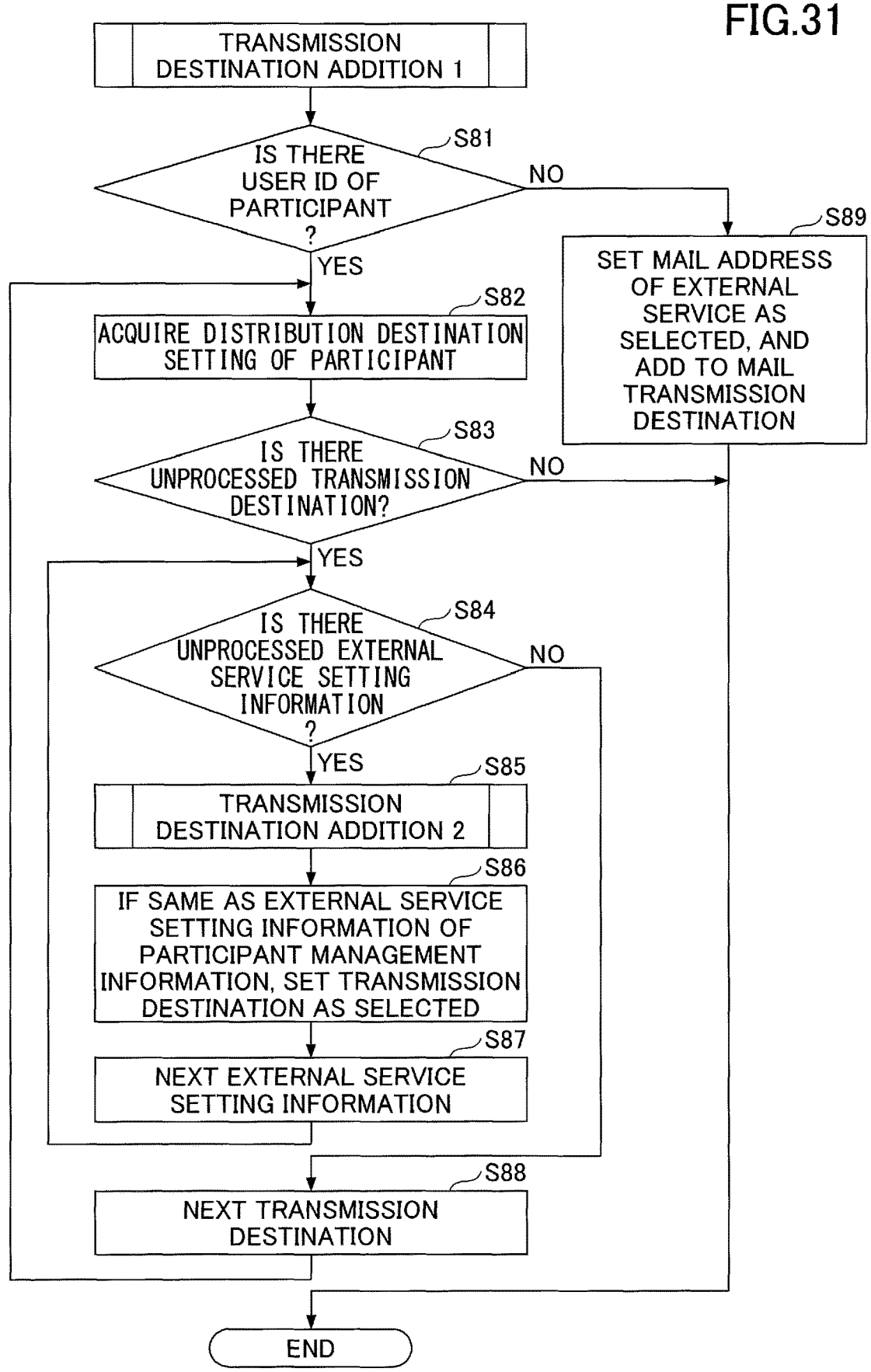
FIG. 31 is a flowchart of an example of a transmission destination addition process according to the third embodiment of the present invention.
Figure 32:
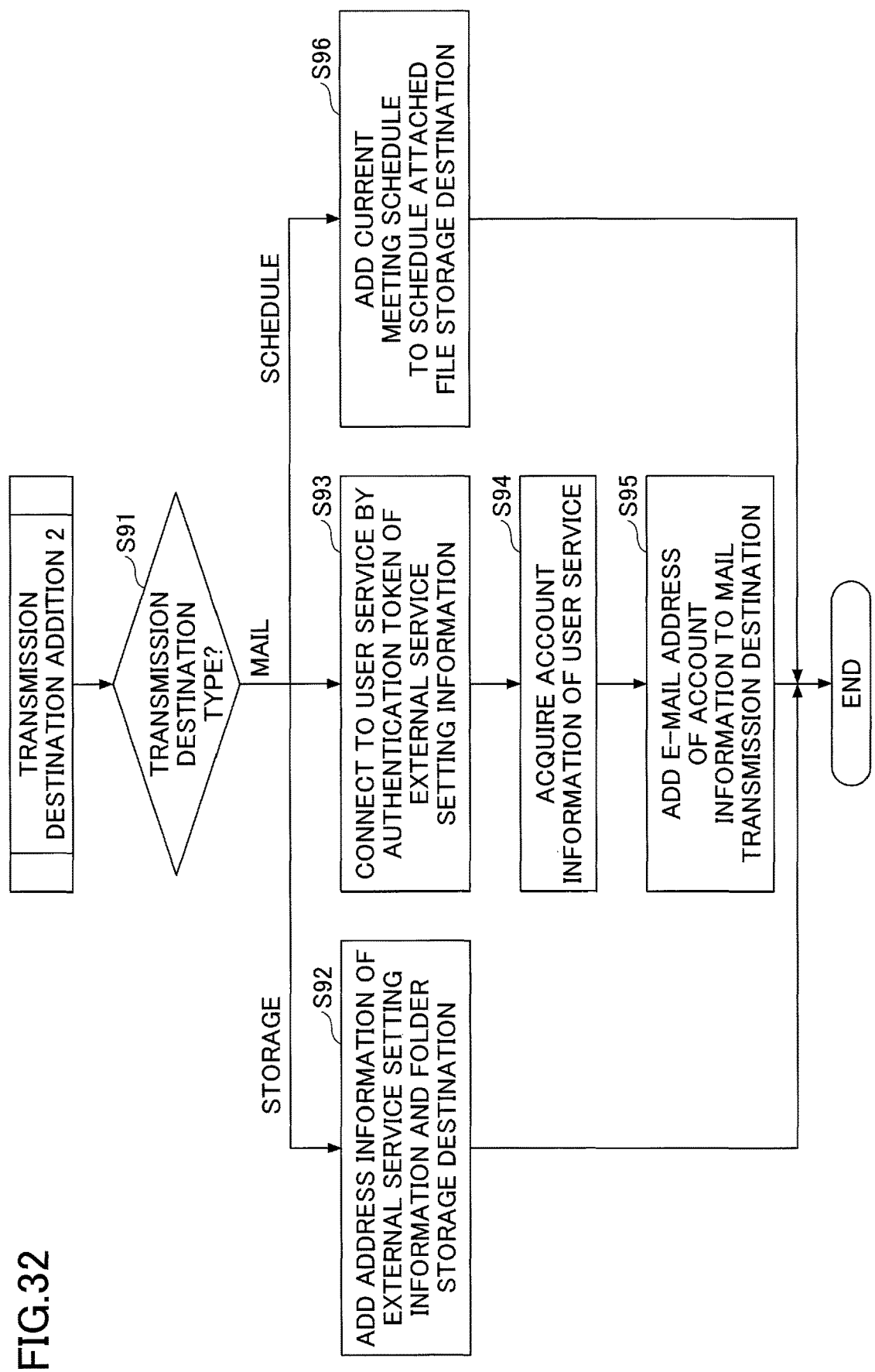
FIG. 32 is a flowchart of an example of a process of adding a transmission destination according to a transmission destination type according to the third embodiment of the present invention.

In the third embodiment, the process in step S32 of the processing procedures to collectively distribute the image data in FIG. 16, is changed to the processing procedures illustrated in FIGS. 31 and 32. FIG. 31 is a flowchart of an example of a transmission destination addition process according to the third embodiment. Step S85 in FIG. 31 becomes the processing procedures illustrated in FIG. 32. FIG. 32 is a flowchart of an example of a process for adding a transmission destination according to the transmission destination type.

The transmission destination addition process illustrated in FIG. 31 is performed for all participants included in the participant management information list. In step S81, the collective distributing unit 42 refers to the participant management information list of FIG. 29, for example, and determines whether the user ID of the specified participant is set. When the user ID of the specified participant is set, the collective distributing unit 42 proceeds to step S82 and requests the distribution destination acquiring unit 40 to perform a transmission destination addition process. The distribution destination acquiring unit 40 acquires the distribution destination setting information of the specified participant from the distribution destination setting information unit 24. The distribution destination acquiring unit 40 repeats the processes of steps S82 to S88 with respect to the transmission destination type such as storage and mail indicated in the transmission destination list of the distribution destination setting information.

Proceeding to step S83, the distribution destination acquiring unit 40 determines whether there is an unprocessed transmission destination type, among the transmission destination types such as storage, mail, and schedule, etc., indicated in the transmission destination list of distribution destination setting information. Furthermore, the distribution destination acquiring unit 40 determines whether there is any unprocessed external service setting information.

The distribution destination acquiring unit 40 performs the processes of steps S85 to S87 for each piece of unprocessed external service setting information with respect to the unprocessed transmission destination type. By the processes of steps S85 to S87, the distribution destination acquiring unit 40 performs a process of adding a transmission destination according to the transmission destination type indicated in FIG. 32. In step S86, when the external service setting ID being processed is the same as the external service setting information in the participant management information list of FIG. 29, the distribution destination acquiring unit 40 sets the transmission destination as selected.

When there are no more unprocessed transmission destination types, the distribution destination acquiring unit 40 ends the process of the flowchart of FIG. 31. In step S81, when the user ID of the specified participant is not set, the distribution destination acquiring unit 40 reads the e-mail address of the external service in the participant management information list of FIG. 29, and adds the e-mail address as the transmission destination of the specified participant.

Furthermore, the process of adding a transmission destination according to the transmission destination type in step S85 is performed as illustrated in FIG. 32. In step S91, when the transmission destination type, such as storage, mail, or schedule indicated in the transmission destination list of the distribution destination setting information, is storage, the distribution destination acquiring unit 40 proceeds to step S92.

In step S92, the distribution destination acquiring unit 40 generates a file storage destination address based on the address information of the external service setting information and the file storage destination of the distribution destination setting information of the specified participant, and adds the file storage destination address as the transmission destination of the specified participant.

In step S91, when the transmission destination type indicated in the transmission destination list of the distribution destination setting information, is mail, the distribution destination acquiring unit 40 proceeds to step S93. In step S93, the distribution destination acquiring unit 40 uses the authentication token of the external service of the external service setting information of the specified participant to connect to the user service 30, and in step S94, the distribution destination acquiring unit 40 acquires the user service account information of the specified participant from the user service 30. Proceeding to step S95, the distribution destination acquiring unit 40 adds the e-mail address of the acquired user service account information, as the transmission destination of the specified participant.

In step S91, when the transmission destination type indicated in the transmission destination list of the distribution destination setting information, is schedule, the distribution destination acquiring unit 40 proceeds to step S96. In step S96, the distribution destination acquiring unit 40 adds the current schedule service schedule information as the transmission destination of the specified participant.

As the process in step S32 of the processing procedures for collective distribution in FIG. 16 is changed to the processing procedures illustrated in FIGS. 31 and 32, in the transmission destination addition process with respect to the user ID "user001" in the user information list in FIG. 20 and the external service setting information in FIG. 21, the distribution destination acquiring unit 40 acquires the distribution destination setting information of the distribution destination setting ID "setting1". Furthermore, the distribution destination acquiring unit 40 adds the schedule service schedule information of the schedule ID "sch-1" to the transmission destinations in the distribution screen 1030, with respect to the "schedule" included in the transmission destination list of the distribution destination setting information of the distribution destination setting ID "setting1" in FIG. 30.

Furthermore, in the transmission destination addition process for the user ID "user002", the distribution destination acquiring unit 40 acquires the distribution destination setting information of the distribution destination setting ID "setting2". Furthermore, with respect to the respective specifications in the transmission destination list in the acquired distribution destination setting information of the distribution destination setting ID "setting2" indicated in FIG. 30, the distribution destination acquiring unit 40 performs a process with respect to all of the external service setting IDs "connect2*a*" and "connect2*b*" associated with the user ID "user002".

First, with respect to the specification of "storage" in the transmission destination list of the distribution destination setting information, the distribution destination acquiring unit 40 generates a file storage destination address "office-.example.com/WeeklyMeeting" from the external service setting information of the external service setting ID "connect2*a*", and adds the file storage destination address as a transmission destination. Furthermore, with respect to the specification of "mail" in the transmission destination list of the distribution destination setting information, the distribution destination acquiring unit 40 queries the external service setting information unit 20 about the e-mail address, by using the external service setting information of the external service setting ID "connect2*a*". The external service setting information unit 20 queries the user service 30 and acquires the user service account information of the user ID "office2". The distribution destination acquiring unit 40 adds the e-mail address "office2@office.example.com" obtained from the user service account information of the user ID "office2", and adds the e-mail address as a transmission destination of the participant "user002".

At this time, the distribution destination acquiring unit 40 determines that the external service setting ID "connect2*a*" being processed matches the external service setting information "connect2*a*" of the user ID "user002" in the participant management information list of FIG. 29, and, therefore, the distribution destination acquiring unit 40 sets the added file storage destination and mail transmission destination as selected.

Furthermore, with respect to the specification of "storage" in the transmission destination list of the distribution destination setting information, the distribution destination acquiring unit 40 generates a file storage destination address "suite.example.com/Weekly Meeting" from the external service setting information of the external service setting ID "connect2*b*", and adds the file storage destination address as a transmission destination.

With respect to the specification in response to the specification of "mail" in the transmission destination list of the distribution destination setting information, the distribution destination acquiring unit 40 uses the external service setting information of the external service setting ID "connect2*b*" to query the external service setting information unit 20 about the e-mail address. The external service setting information unit 20 queries the user service 30 and acquires the user service account information of the user ID "suite2". The distribution destination acquiring unit 40 adds the e-mail address "suite2@suite.example.com" obtained from the user service account information of the user ID "suite2", as the transmission destination of the participant "user002".

At this time, the external, service setting ID "connect2*b*" being processed does not match the external service setting information "connect2*a*" of the user ID "user002" in the participant management information list of FIG. 29, and, therefore, the distribution destination acquiring unit 40 does not set the added file storage destination and mail transmission destination as selected. Furthermore, the distribution destination acquiring unit 40 also adds the e-mail address "sato@intra.example.com" set in the user information list of the user ID "user002", as a selected transmission destination.

In the transmission destination addition process with respect to the e-mail address "Motoko<office3@ office.example.com>" of the external service in the participant management information list, the participant is not included in the user information list of FIG. 20, and, therefore, the distribution destination acquiring unit 40 does not acquire the distribution destination setting information but adds the e-mail address "Motoko<office3@office.example.com>" of the mail service 34 as the selected transmission destination.

As a result, the generated distribution screen 1030 is as illustrated in FIG. 33. FIG. 33 is an image diagram of an example of a distribution screen according to the third embodiment. In the distribution screen 1030 of FIG. 33, the selected transmission destinations are displayed as the transmission destinations to be the targets of the all transmission execution process, and, therefore, the optimum transmission destination for each participant is posted.

Figure 34:
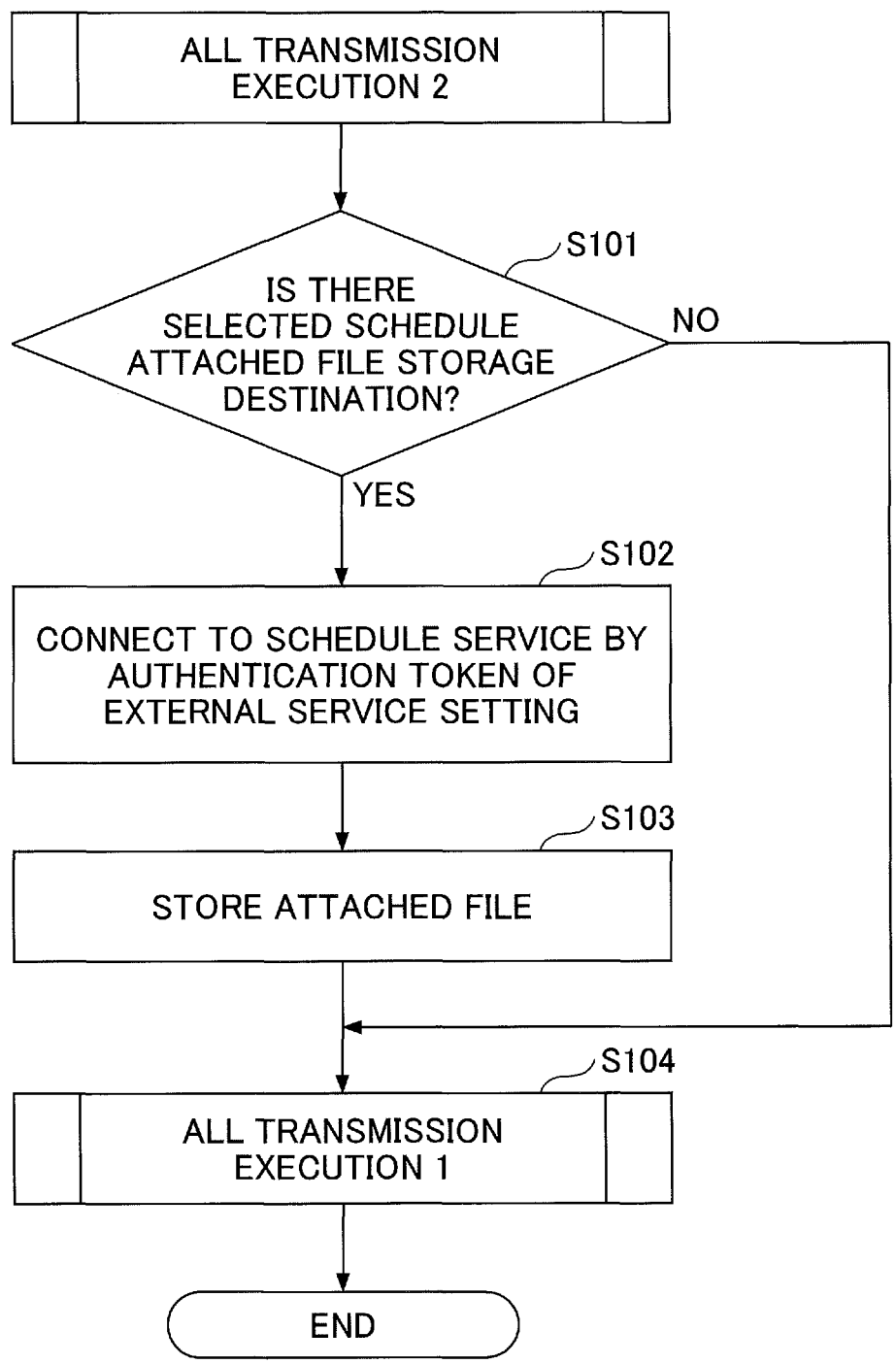
FIG. 34 is a flowchart of an example of an all transmission execution process according to the third embodiment of the present invention.

Furthermore, the all transmission execution process according to the third embodiment is executed, for example, by the procedures of FIG. 34. FIG. 34 is a flowchart of an example of the all transmission execution process according to the third embodiment. In the all transmission execution process illustrated in FIG. 34, the process in step S104 corresponds to the processes of steps S51 to S58 in FIG. 18.

When storing a file in the schedule service schedule information of the schedule ID "sch-1", an authentication token of the external service with the external service setting ID "connect1*a*" corresponding to the owner user "office1" is used to connect to the schedule service 36 and store the file. By doing so, the meeting schedule itself can be included in the transmission destination of the image data of the content displayed by the electronic blackboard apparatus 14, thereby facilitating sharing among the participants.

Fourth Embodiment

The external service group system 12 described in the first and second embodiments may include a shared site service. The shared site service performs collaboration and document management within a specific user group, and is, for example, SharePoint (registered trademark), etc. In such a shared site service, for example, a site is created for each team or project, and the site is used for information sharing (collaborative work) among the members. Therefore, in the fourth embodiment, a scheduled attendee of a meeting is set as a member in the shared site service of the external service group system 12, and the scheduled attendee is set as a target of the all transmission execution process.

Figure 35:
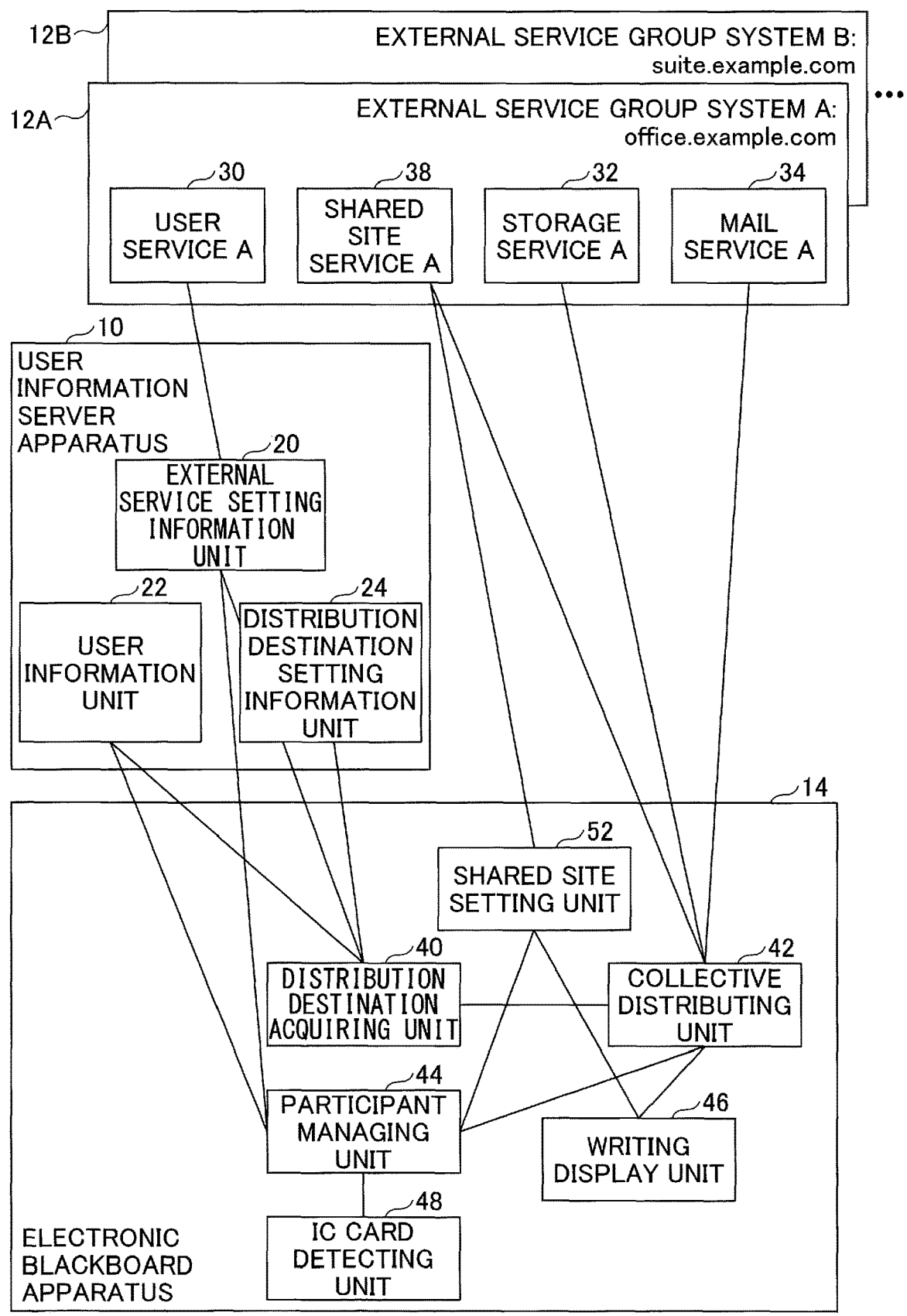
FIG. 35 is a functional configuration diagram of an example of the information processing system according to a fourth embodiment of the present invention.

FIG. 35 is a functional configuration diagram of an example of the information processing system according to the fourth embodiment. The functional configuration of FIG. 35 has a configuration in which a shared site service 38 and a shared site setting unit 52 are added to the functional configuration of FIG. 4. The shared site service 38 is added to the external service group system 12A. The shared site setting unit 52 is added to the electronic blackboard apparatus 14.

The shared site service 38 stores shared site service site information as illustrated in FIG. 36, for example. FIG. 36 is a configuration diagram of an example of shared site service site information according to the fourth embodiment. As illustrated in FIG. 36, the shared site service 38 stores the site ID, the site name, the owner user, and the member, as shared site service site information.

The shared site setting unit 52 of the electronic blackboard apparatus 14 includes a user interface for selecting the shared site to be used, and communicates with the shared site service 38 of the external service group system 12 to display the shared site service site information list and to prompt the user to make a selection.

As an outline of the process, after starting the meeting, the shared site setting unit 52 regards the participant detected first as the organizer, and a shared site service site information list in which the corresponding participant is the owner user, is posted for the user. When the user selects the shared site service 38 from the shared site service site information list of the owner user, the participant managing unit 44 of the electronic blackboard apparatus 14 adds the members of the shared site service site information selected by the user, to the participant list 1002 in the operation panel 1000.

Figure 37:
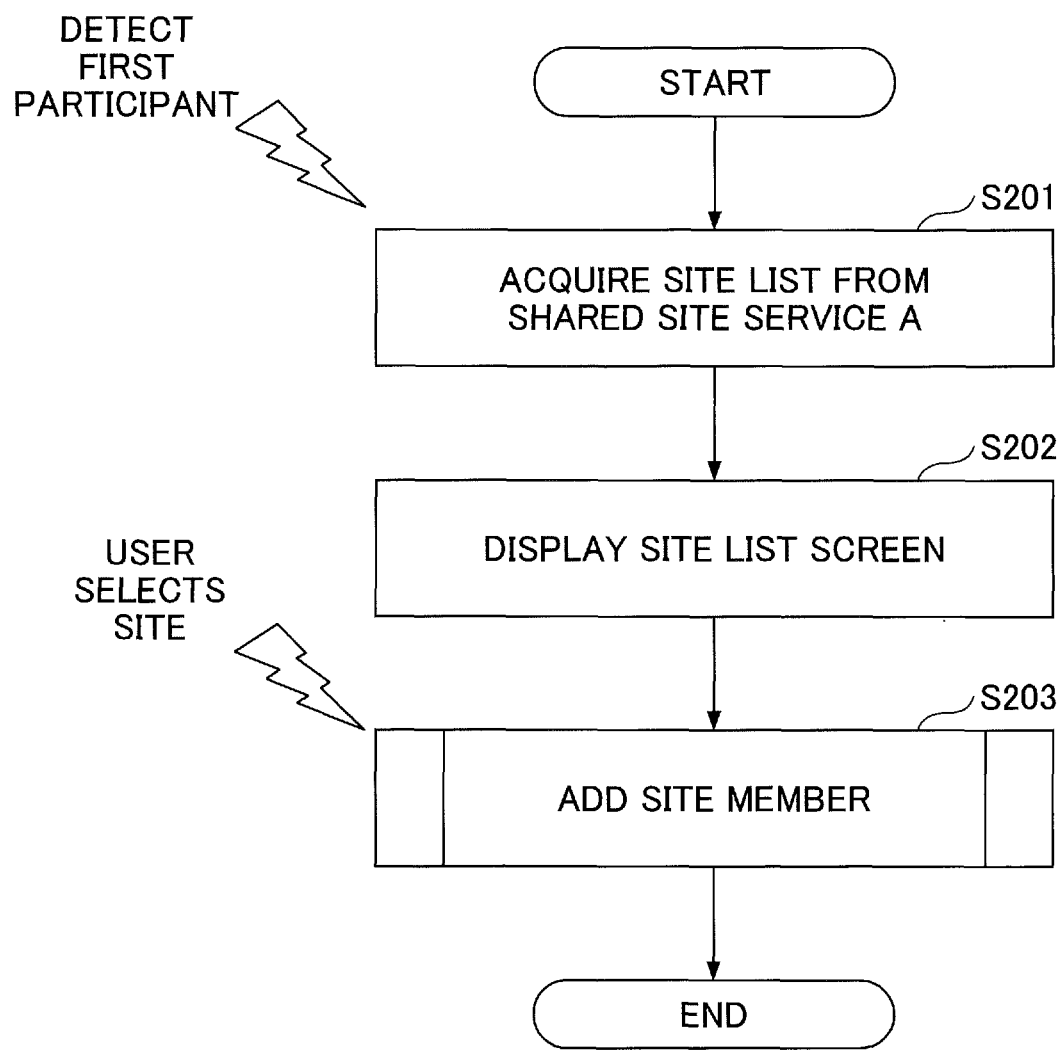
FIG. 37 is a flowchart of an example of a process for setting shared site service site information according to the fourth embodiment of the present invention.

FIG. 37 is a flowchart of an example of a process for setting shared site service site information according to the fourth embodiment. In processing procedures in the process of setting the shared site service site information of FIG. 37, when the shared site setting unit 52 detects the first participant, a shared site service site information list in which the corresponding participant is the owner user, is posted for the user, and based on a selection by the user, the transmission destination to be the target of the all transmission execution process of step S35 is selected.

Figure 39:
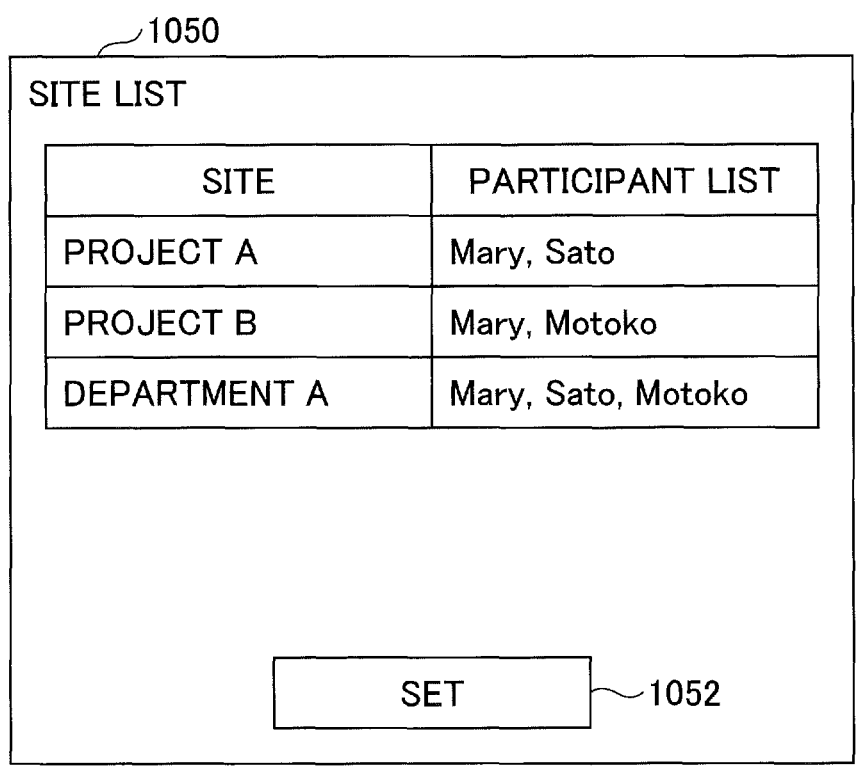
FIG. 39 is an image diagram of an example of a shared site service site information list screen according to the fourth embodiment of the present invention.

In step S201, the shared site setting unit 52 acquires the shared site service site information list from the shared site service 38 of the external service group system 12A based on the shared site service site information in which the first detected participant is the owner user. Proceeding to step S202, for example, a shared site service site information list screen 1050 illustrated in FIG. 39 is displayed, and the user is prompted to select a shared site service. FIG. 39 is an image diagram of an example of the shared site service site information list screen according to the fourth embodiment. Proceeding to step S203, the shared site setting unit 52 reports the members of the shared site service 38 selected by the user to the participant managing unit 44, so that the members are added to the participant management information list.

Figure 38:
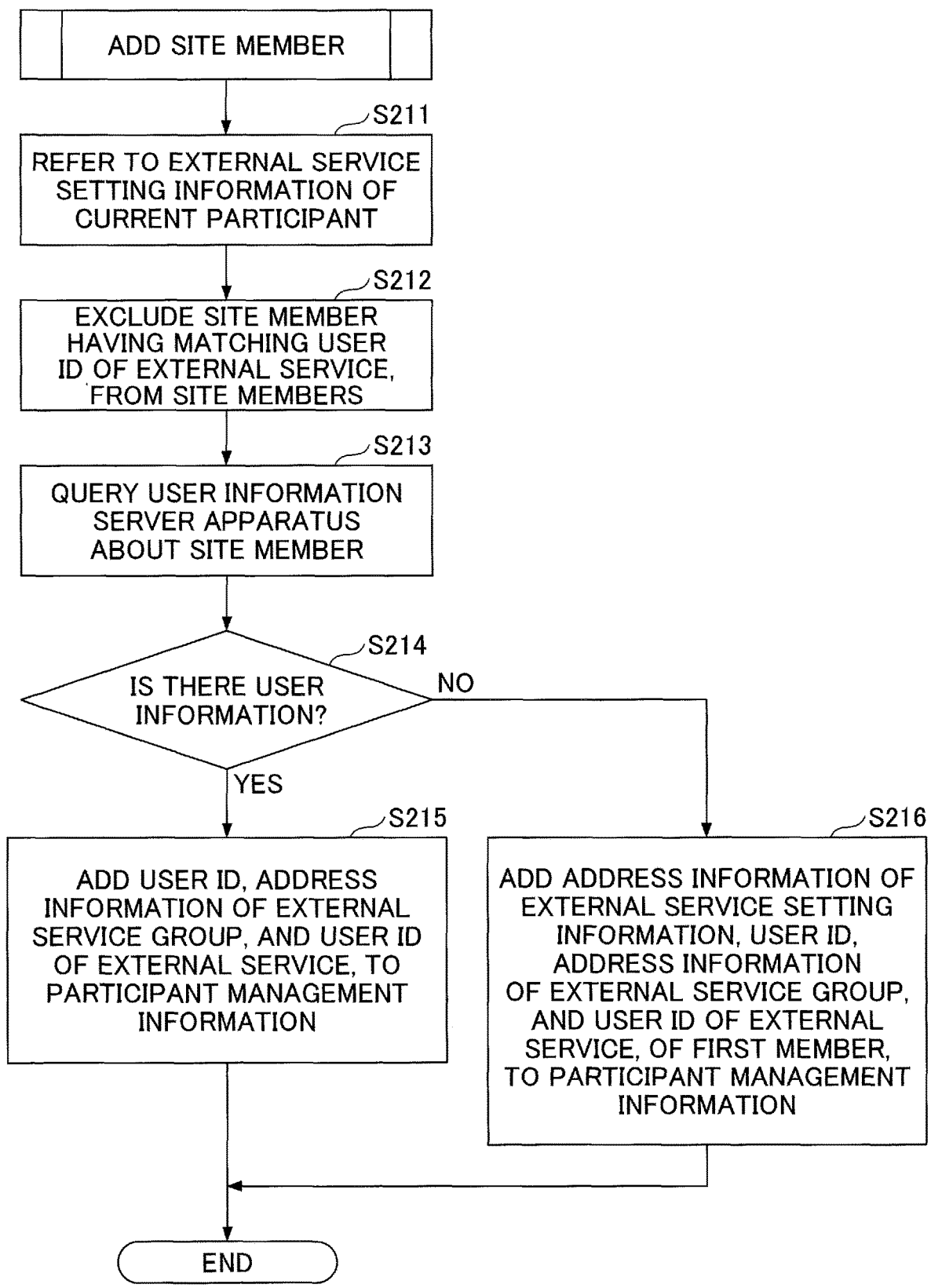
FIG. 38 is a flowchart of an example of a process of adding a member of a shared site service according to the fourth embodiment of the present invention.

In step S203 of FIG. 37, the member addition process of the shared site service 38 is performed, for example, by the procedures illustrated in FIG. 38. FIG. 38 is a flowchart of an example of a process for adding a member of the shared site service. In step S211, the participant managing unit 44 refers to the external service setting information unit 20 for the external service setting information of the participant detected first (current participant).

Proceeding to step S212, the participant managing unit 44 excludes, from the members of the shared site service 38 selected by the user, a member having a user ID matching the user ID of the current participant. Proceeding to step S213, the participant managing unit 44 queries the user information unit 22 about the user information corresponding to the user ID of the external service of the member of the shared site service 38.

When there is user information corresponding to the user ID of the external service (YES in step S214), the process proceeds to step S215 and the participant managing unit 44 adds, to the to the participant management information list of FIG. 29, the user ID and external service setting information (address information of the external service group system 12 and the user ID of the external service) of the member of the shared site service 38. When there is no user information corresponding to the user ID of the external service (NO in step S214), the process proceeds to step S216, and the user ID and e-mail address of the external service of the member of the shared site service 38 are added to the participant management information list of FIG. 29.

Here, the processes of the flowcharts of FIGS. 37 and 38 will be specifically described by taking the shared site service site information of FIG. 36, the user service account information of FIG. 27, and the participant management information list of FIG. 29 as an example. The participant with the user ID "user001", who is the organizer of the meeting, is detected by the IC card 630.

Here, it is assumed that the user information list of the user ID "user001" illustrated in FIG. 7, the external service setting information of the external service setting ID "connect1*a*" illustrated in FIG. 21, and the user service account information of the user ID "office1" illustrated in FIG. 27 are acquired, and the user with the user ID "user001" is set as the first participant in the participant management information list in the participant managing unit 44 illustrated in FIG. 29.

The shared site setting unit 52 receives, from the participant managing unit 44, the user ID "user001" and the external service setting ID "connect1*a*" of the first detected participant. Based on the external service setting information of the external service setting ID "connect1*a*", the shared site setting unit 52 uses the authentication token "eyJhbGcl1 . . . " of the external service to connect to the shared site service 38 of the address information "office.example.com", to acquire the shared site service site information in which the user ID "office 1" is set as the owner user.

The shared site setting unit 52 displays a shared site service site information list screen 1050 illustrated in FIG. 39 based on the acquired shared site service site information, and prompts the user to select the shared site service 38. When the user selects the shared site service "department A"

from the shared site service site information list screen 1050 of FIG. 39, the shared site setting unit 52 reports the external service setting ID "connect1*a*" and the scheduled attendees "office 1, office 2, and office 3" to the participant managing unit 44.

The participant managing unit 44 checks the external service setting information of the external service setting ID "connect1*a*" corresponding to the user ID "user 001" of the participant. The user ID of the external service of the external service setting information is "office 1", and, therefore, the participant managing unit 44 deletes "office 1" from the reported scheduled attendees "office 1, office 2, and office 3".

Next, the participant managing unit 44 queries the user information server apparatus 10 in order to identify the remaining scheduled attendees "office 2 and office 3". The external service setting information unit 20 of the user information server apparatus 10 returns, from the external service setting information illustrated in FIG. 21, the external service setting ID "connect2*a*" of the external service setting information having "office2" as the user ID of the external service and the user ID "user002".

Note that with respect to "office 3", the external service setting information unit 20 of the user information server apparatus 10 does not return anything because the external service setting information having "office3" as the user ID of the external service cannot be found in the external service setting information illustrated in FIG. 21.

The participant managing unit 44 adds the external service setting ID "connect2*a*" and the user ID "user002" obtained by querying about the user ID "office2" of the external service, as illustrated in the participant management information list of FIG. 29. The participant managing unit 44 cannot obtain anything in response to the query about the user ID "office3" of the external service, and, therefore, the participant managing unit 44 adds the e-mail address "office3@office.example.com" of the mail service 34 of the external service group system 12A set in the user service account information of FIG. 27, as illustrated in the participant management information list of FIG. 29.

In the process of collective distribution after the process of setting the shared site service site information in FIG. 37 is finished, when the participant has a plurality of pieces of external service setting information, the external service group of the external service group system 12 having the used shared site service 38 is preferentially selected as the transmission destination. Accordingly, is possible to reduce the labor of the user of excluding an external service group having low relevance from the transmission destination.

Furthermore, when nothing is obtained as in the case of querying about the user ID "office3" of the external service, by using the e-mail address of the mail service 34 of the external service group system 12A as the transmission destination, a user that is not registered in the user information unit 22 also becomes the distribution target of the image data of the content displayed by the electronic blackboard apparatus 14.

Furthermore, as illustrated in a transmission destination list of distribution destination setting information in FIG. 40, the shared site service 38 may be set as the transmission destination of the image data of the content displayed by the electronic blackboard apparatus 14.

FIG. 40 is a configuration diagram of one example of the distribution destination setting information according to the fourth embodiment. In the shared site service 38 set in the transmission destination list, for example, image data of content displayed on the electronic blackboard apparatus 14 is stored. Accordingly, it becomes easy to collectively distribute the image data of the content displayed by the electronic blackboard apparatus 14, for example, via the shared site service 38 of the external service group system 12.

Figure 41:
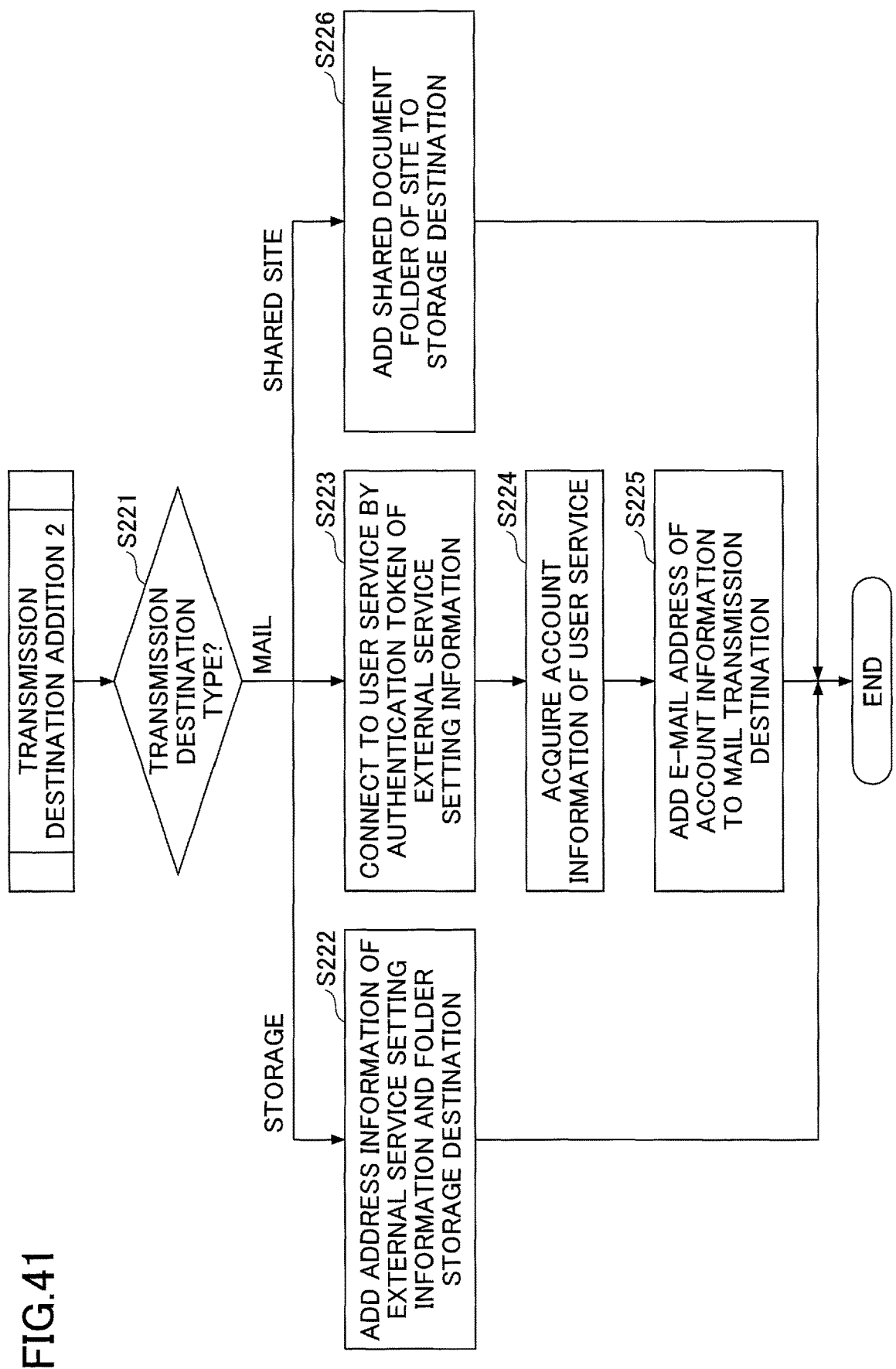
FIG. 41 is a flowchart of an example of a process of adding a transmission destination according to a transmission destination type according to the fourth embodiment of the present invention.

In the fourth embodiment, the process in step S85 of the third embodiment is changed to the processing procedures illustrated in FIG. 41. FIG. 41 is a flowchart of an example of a transmission destination addition process according to a transmission destination type. In step S221, when the transmission destination type such as the storage, mail, or shared site indicated in the transmission destination list of the distribution destination setting information is storage, the distribution destination acquiring unit 40 proceeds to step S222.

In step S222, the distribution destination acquiring unit 40 generates a file storage destination address based on the address information of the external service setting information and the file storage destination of the distribution destination setting information of the specified participant, and adds the file storage destination address as the transmission destination of the specified participant.

In step S221, when the transmission destination type indicated in the transmission destination list of the distribution destination setting information is mail, the distribution destination acquiring unit 40 proceeds to step S223. In step S223, the distribution destination acquiring unit 40 uses the authentication token of the external service of the external service setting information of the specified participant to connect to the user service 30, and acquires the user service account information of the specified participant from the user service 30 in step S224. Proceeding to step S225, the distribution destination acquiring unit 40 adds the e-mail address of the acquired user service account information as the transmission destination of the specified participant.

In step S221, when the transmission destination type indicated in the transmission destination list of the distribution destination setting information is the shared site, the distribution destination acquiring unit 40 proceeds to step S226. In step S226, the distribution destination acquiring unit 40 adds, for example, a shared document folder of the shared site service 38 as a storage destination.

By changing the process in step S32 of the collective distribution processing procedures in FIG. 16 to the processing procedures illustrated in FIGS. 31 and 41, a distribution screen 1060 as illustrated in FIG. 42 is generated. FIG. 42 is an image diagram of an example of a distribution screen according to the fourth embodiment. In the distribution screen 1060 of FIG. 42, the selected transmission destinations are displayed as the transmission destinations to be targets of the all transmission execution process, and, therefore, the optimum transmission destination for each participant is posted.

Figure 43:
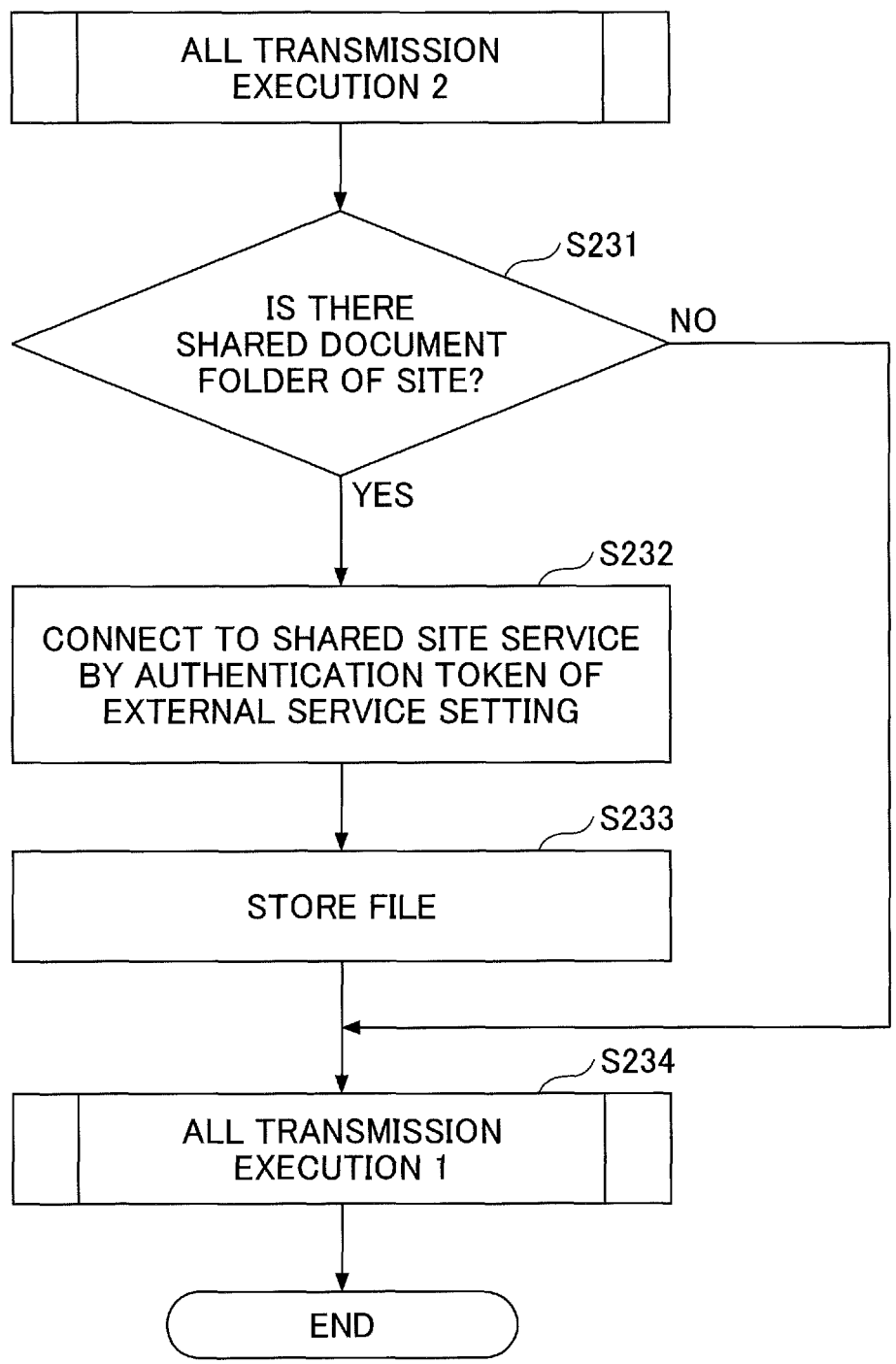
FIG. 43 is a flowchart of an example of an all transmission execution process according to the fourth embodiment of the present invention.

Furthermore, the all transmission execution process according to the fourth embodiment is executed by the procedures of FIG. 43, for example. FIG. 43 is a flowchart of an example of the all transmission execution process according to the fourth embodiment. In the all transmission execution process illustrated in FIG. 43, the process of step S234 corresponds to the processes of steps S51 to S58 in FIG. 18.

When storing the file in the shared document folder of the shared site service 38, the authentication token of the external service with the external service setting ID "connect1*a*" corresponding to the owner user "office1" is used to connect to the shared site service 38 and store the file. In this way, it is possible to include the shared document folder of the shared site service 38 in the transmission destination of the image data of the content displayed by the electronic blackboard apparatus 14, thereby facilitating the sharing among the participants.

Fifth Embodiment

Among the storage services 32 of the external service group system 12 described in the first to fourth embodiments, there are services in which a setting for sharing a folder or a file may be made. Furthermore, as a usage form of a storage service 32, a folder is hierarchically created for each project or case, and a setting for sharing a folder or a file may be made with respect to the people related to the project, so that information can be shared.

Therefore, in the fifth embodiment, a scheduled attendee of a meeting is set as a user who shares a folder or a file of the storage service 33 of the external service group system 12, and the scheduled attendee is set as a target of the all transmission execution process. In the following, an example of sharing a folder set to be shared (shared folder) will be described.

Figure 44:
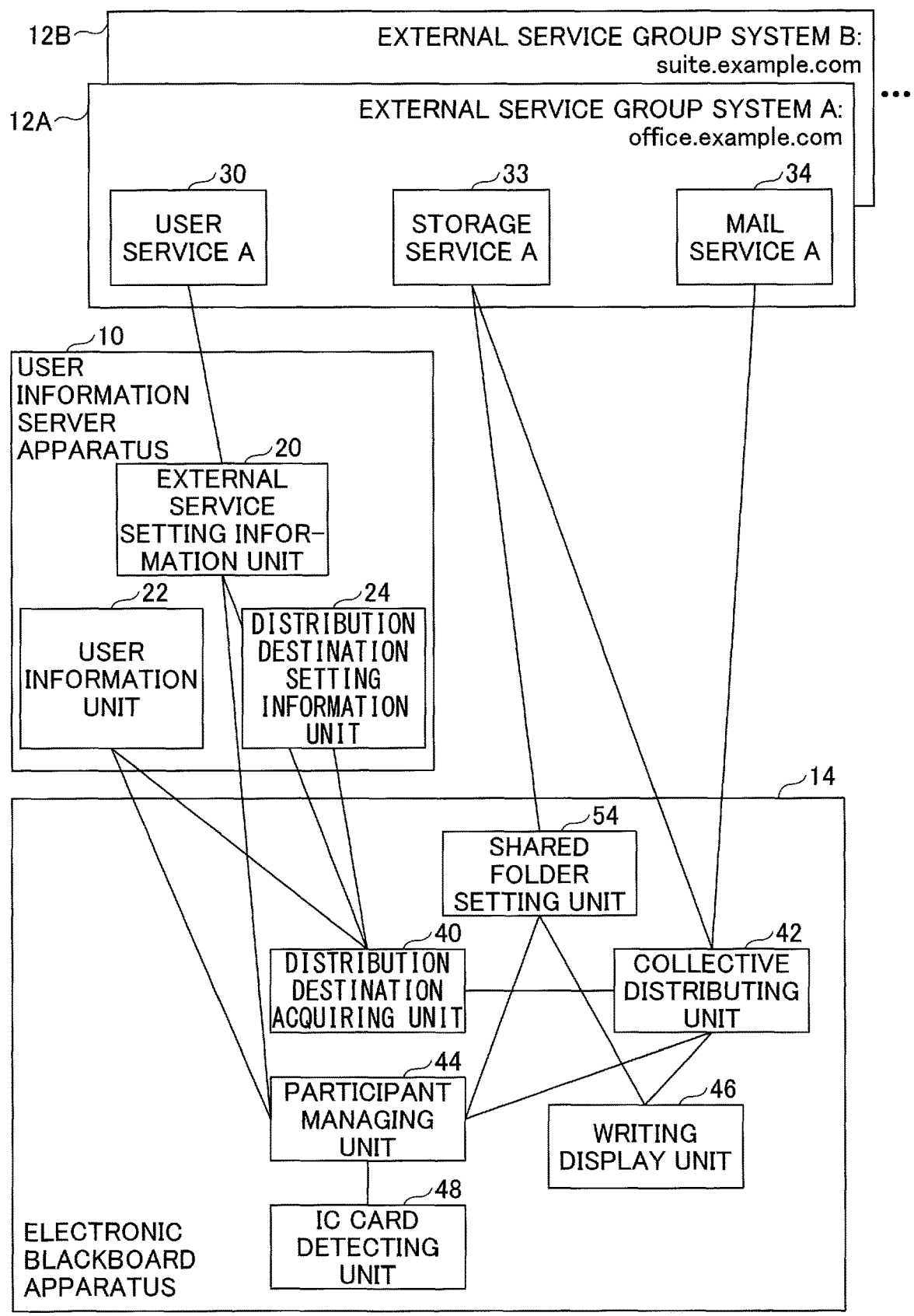
FIG. 44 is a functional configuration diagram of an example of the information processing system according to a fifth embodiment of the present invention.

FIG. 44 is a functional configuration diagram of an example of the information processing system according to the fifth embodiment. The functional configuration of FIG. 44 is a configuration in which a shared folder setting unit 54 is added to the functional configuration of FIG. 4. In FIG. 44, the shared folder setting unit 54 is added to the electronic blackboard apparatus 14.

The shared folder setting unit 54 of the electronic blackboard apparatus 14 includes storage service item hierarchy information illustrated in FIGS. 45A and 45B and storage service item sharing information illustrated in FIG. 46. The shared folder setting unit 54 includes a user interface for selecting a folder to be used from the folders of the storage service 33, communicates with the storage service 33, displays a folder information list of the storage service 33, and prompts the user to select a shared folder.

As an outline of the process, after starting the meeting, the shared folder setting unit 54 regards the first detected participant as the organizer, and a folder information list of the storage service 33 in which the corresponding participant is the owner user, is posted for the user. When the user selects a shared folder from the posted folder information list, the participant managing unit 44 of the electronic blackboard apparatus 14 adds the user sharing the shared folder selected by the user, to the participant list 1002 in the operation panel 1000.

Figure 47:
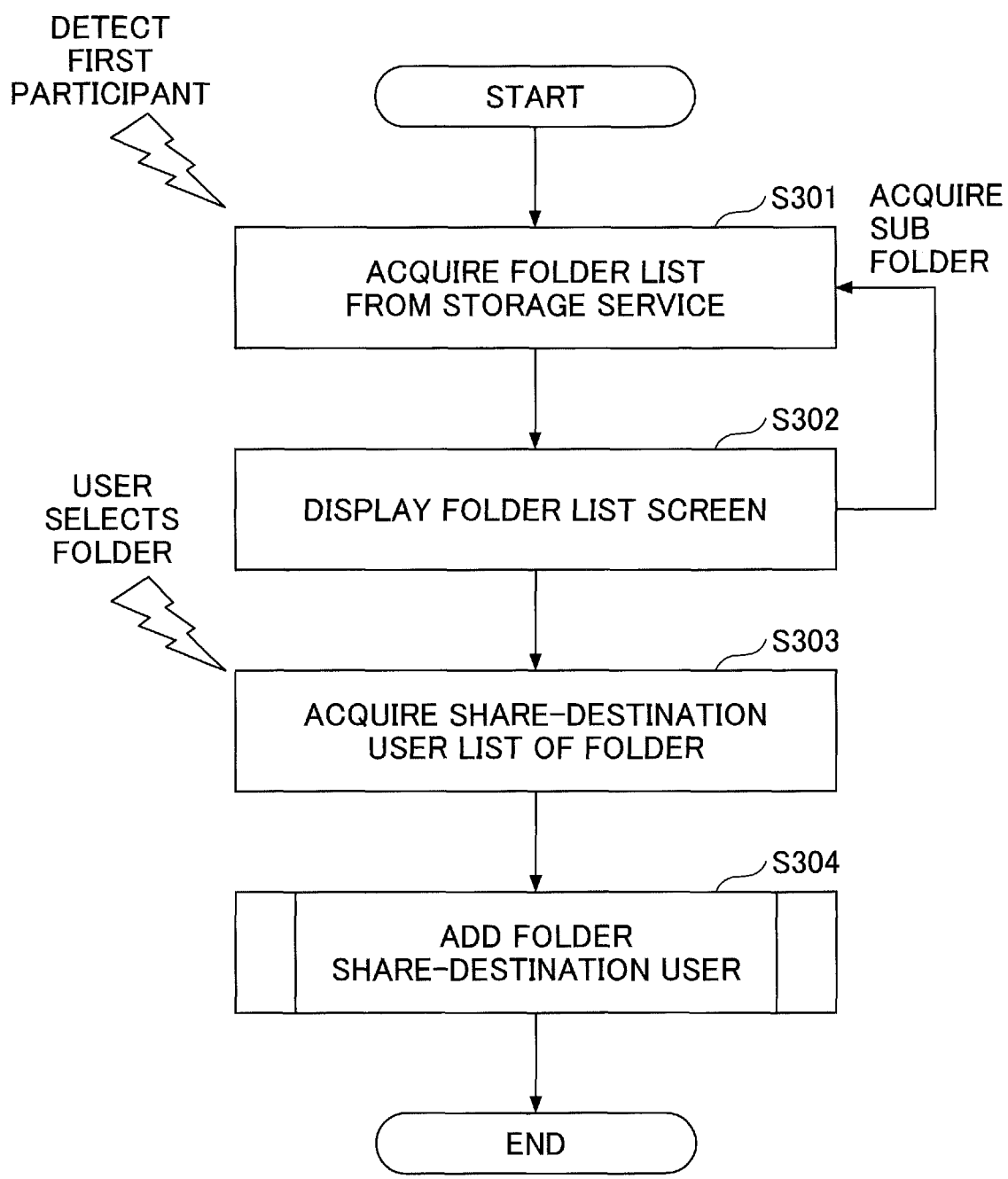
FIG. 47 is a flowchart of an example of a process for setting storage service shared folder information according to the fifth embodiment of the present invention.

FIG. 47 is a flowchart of an example of a process for setting the storage service shared folder information according to the fifth embodiment. In the processing procedures of the process of setting the storage service shared folder information of FIG. 47, when the shared folder setting unit 54 detects the first participant, a folder information list in which the corresponding participant is the owner user, is posted for the user, and based on a selection made by the user, a transmission destination to be a target of the all transmission execution process of step S35 is selected.

Figure 49A:
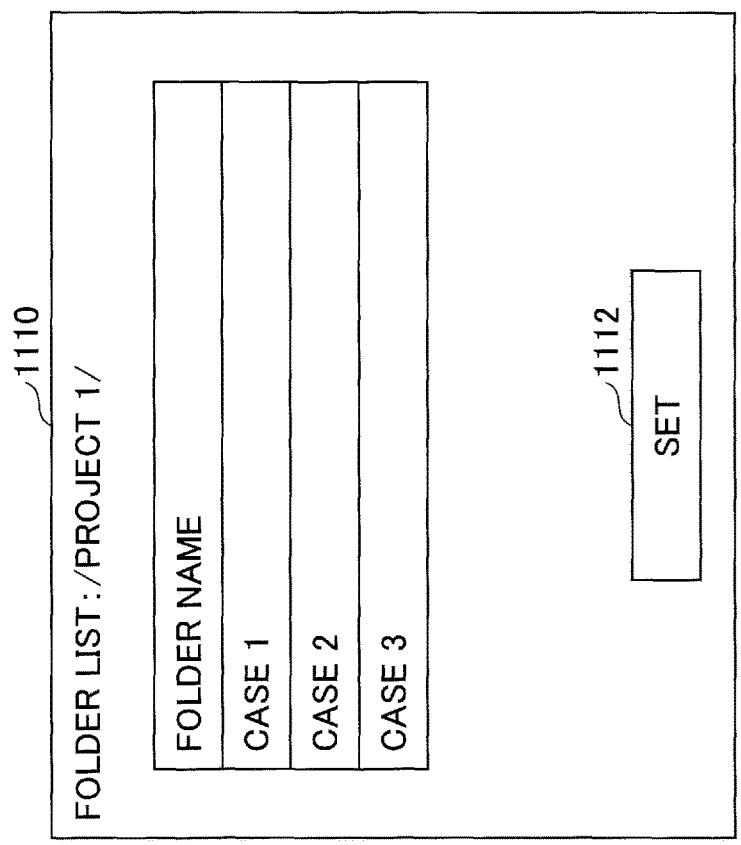
FIGS. 49A and 49B are image diagrams of an example of a storage service shared folder information list screen according to the fifth embodiment of the present invention.
Figure 49B:
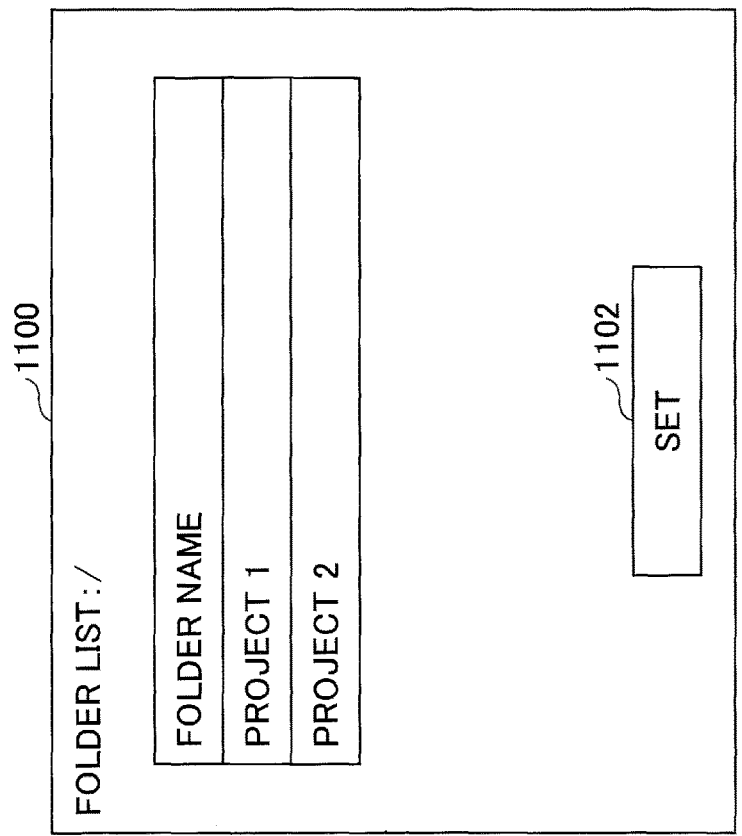

In step S301, the shared folder setting unit 54 acquires the folder information list from the storage service 33 of the external service group system 12A based on the storage service shared folder information in which the first detected participant is the owner user. Proceeding to step S302, for example, storage service shared folder information list screens 1100 and 1110 illustrated in FIGS. 49A and 49B are displayed, and the user is prompted to select a shared folder. FIGS. 49A and 49B are image diagrams of an example of the storage service shared folder information list screen according to the fifth embodiment. In steps S303 and S304, the shared folder setting unit 54 reports a user who shares the shared folder selected by the user, to the participant managing unit 44, so that the user is added to the participant management information list.

Figure 48:
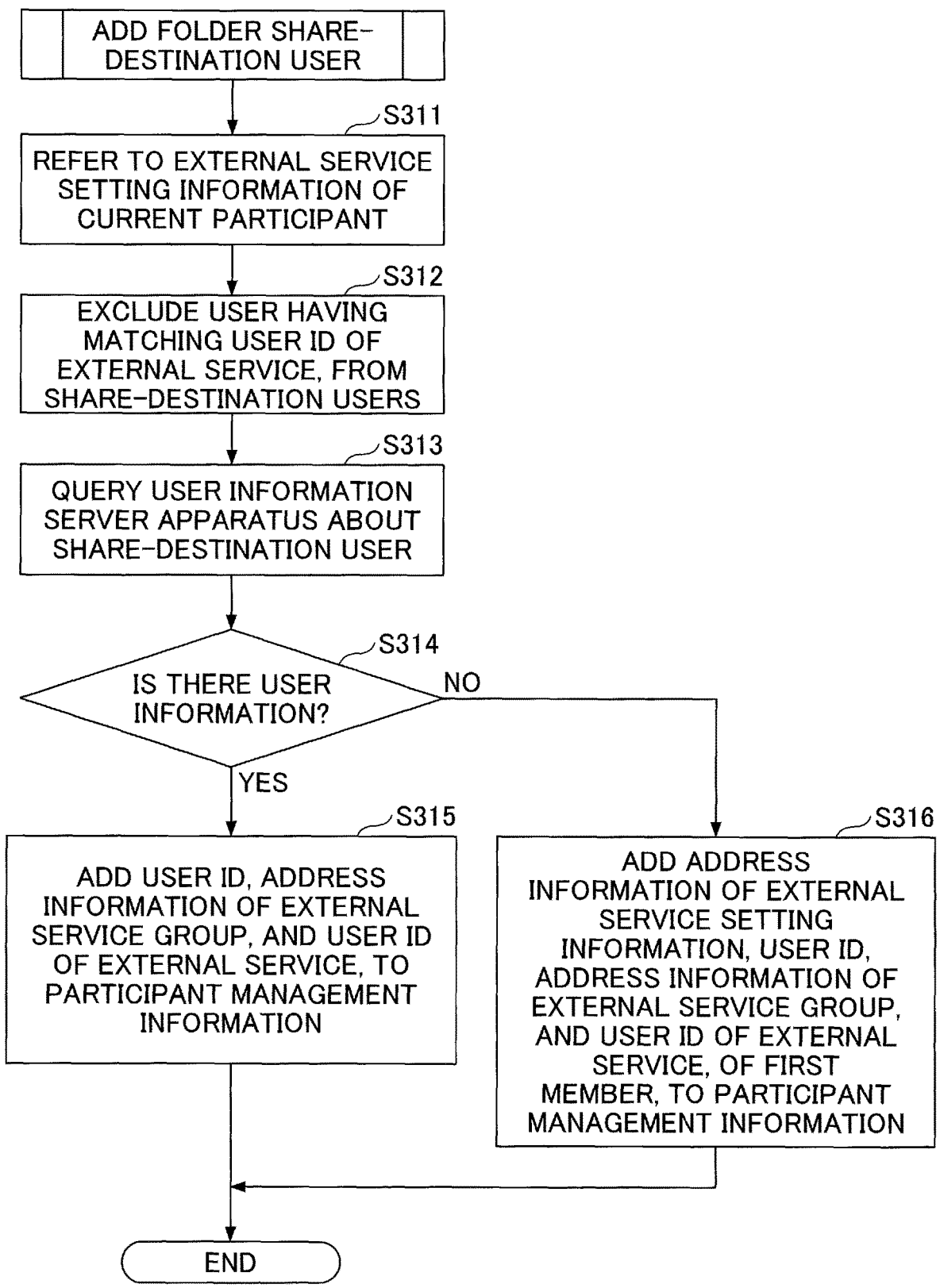
FIG. 48 is a flowchart of an example of a process of adding a user sharing a shared folder of a storage service according to the fifth embodiment of the present invention.

In step S304 of FIG. 47, for example, by the procedures illustrated in FIG. 48, a user addition process for sharing the shared folder of the storage service 33 is performed. FIG. 48 is a flowchart of an example of a process of adding a user sharing a shared folder of the storage service. In step S311, the participant managing unit 44 refers to the external service setting information unit 20 for the external service setting information of the participant detected first (current participant).

Proceeding to step S312, the participant managing unit 44 excludes a user having a user ID that matches the user ID of the current participant, from the users (share-destination users) sharing the shared folder selected by the user. Proceeding to step S313, the participant managing unit 44 queries the user information unit 22 about the user information corresponding to the user ID of the external service of the share-destination user.

When there is user information corresponding to the user ID of the external service (YES in step S314), the process proceeds to step S315 and the participant managing unit 44 adds the user ID and external service setting information (address information of the external service group system 12 and user ID of the external service) of the share-destination user, to the participant management information list of FIG. 29. When there is no user information corresponding to the user ID of the external service (NO in step S314), the process proceeds to step S316 to add the user ID and e-mail address of the external service of the share-destination user to the participant management information list of FIG. 29.

Here, the processes of the flowcharts of FIGS. 47 and 48 will be specifically described by taking the storage service item sharing information of FIG. 46, the user service account information of FIG. 27, and the participant management information list of FIG. 29 as an example. The participant with the user ID "user001" who is the organizer of the meeting is detected by the IC card 630.

Here, it is assumed that the user information list of the user ID "user001" indicated in FIG. 7, the external service setting information of the external service setting ID "connect1*a*" indicated in FIG. 21, and the user service account information of the user ID "office1" indicated in FIG. 27 are acquired, and that the user with the user ID "user001" is set as the first participant in the participant management information list of the participant managing unit 44 illustrated in FIG. 29.

The shared folder setting unit 54 receives, from the participant managing unit 44, the user ID "user001" and the external service setting ID "connect1*a*" of the first detected participant. Based on the external service setting information of the external service setting ID "connect1*a*", the shared folder setting unit 54 uses the external service authentication token "eyJhbGc11 . . . " to connect to the storage service 33 having the address information "office- .example.com" and acquire the storage service shared folder information in which the user ID "office1" is set as the owner user.

Based on the acquired storage service shared folder information, the shared folder setting unit 54 displays the storage service shared folder information list screens 1100 and 1110 illustrated in FIGS. 49A and 49B, and prompts the user to select a shared folder. For example, in the storage service shared folder information list screens 1100 and 1110 illustrated in FIGS. 49A and 49B, the user can select a shared folder by tapping a folder so that the folder is in a selected state, and pressing a set button 1102 or 1112. Furthermore, for example, by double-clicking the folder displayed on the storage service shared folder information list screen 1100, the user can cause the screen to transition from the storage service shared folder information list screen. 1100 to the storage service shared folder information list screen 1110.

Here, the description continues assuming that the user has selected the "case1" folder in the "project1" folder. The shared folder setting unit 54 acquires the share-destination user list of the item ID "item11" illustrated in FIG. 46, from the storage service 33. The shared folder setting unit 54 reports the external service setting ID "connect1a" and the scheduled attendees "office 1, office 2, and office 3" to the participant managing unit 44.

The process by the participant managing unit 44 thereafter is the same as that of the fourth embodiment. As the transmission destination of the image data of the content displayed by the electronic blackboard apparatus 14, a shared folder is set as illustrated in the transmission destination list of the distribution destination setting information in FIG. 50.

FIG. 50 is a configuration diagram of one example of the distribution destination setting information according to the fifth embodiment. In the shared folder set in the transmission destination list, for example, the image data of the content displayed by the electronic blackboard apparatus 14 is stored. This makes it easy to collectively distribute, for example, the image data of the content displayed by the electronic blackboard apparatus 14 to the share-destination users of the storage service 33 of the external service group system 12.

Figure 51:
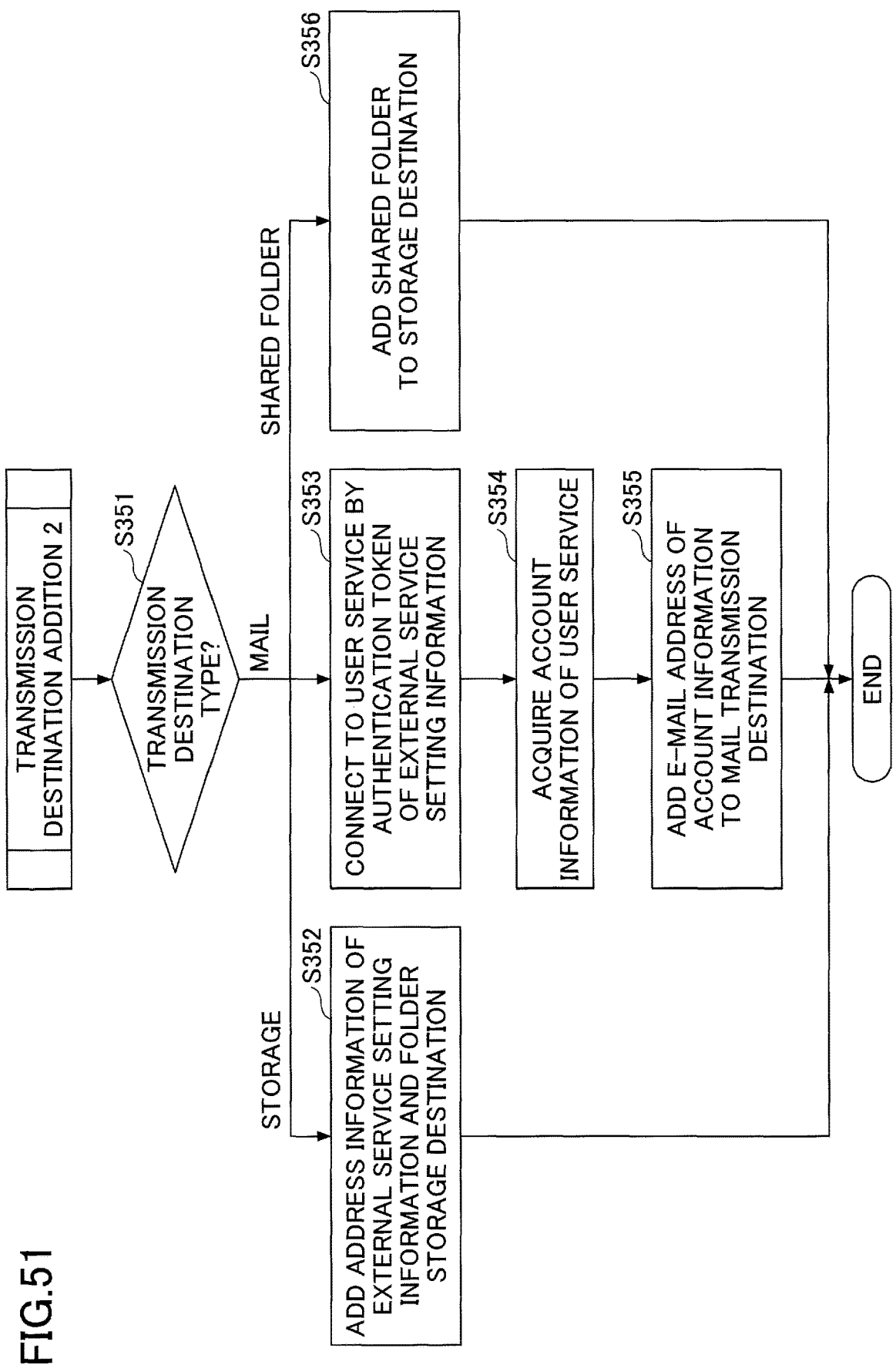
FIG. 51 is a flowchart of an example of a process of adding a transmission destination according to a transmission destination type according to the fifth embodiment of the present invention.

In the fifth embodiment, the process in step S85 of the third embodiment is changed to the processing procedures illustrated in FIG. 51. FIG. 51 is a flowchart of an example of a transmission destination addition process according to the transmission destination type. In step S351, when the transmission destination type such as storage, mail, or shared folder illustrated in the transmission destination list of the distribution destination setting information, is storage, the distribution destination acquiring unit 40 proceeds to step S352.

In step S352, the distribution destination acquiring unit 40 generates a file storage destination address based on the address information of the external service setting information and the file storage destination of the distribution destination setting information of the specified participant, and adds the file storage destination address as the transmission destination of the specified participant.

In step S351, when the transmission destination type indicated in the transmission destination list of the distribution destination setting information is mail, the distribution destination acquiring unit 40 proceeds to step S353. In step S353, the distribution destination acquiring unit 40 uses the authentication token of the external service of the external service setting information of the specified participant to connect to the user service 30, and acquires the user service account information of the specified participant from the user service 30 in step S354. Proceeding to step S355, the distribution destination acquiring unit 40 adds the e-mail address of the acquired user service account information as the transmission destination of the specified participant.

In step S351, when the transmission destination type indicated in the transmission destination list of the distribution destination setting information is a shared folder, the distribution destination acquiring unit 40 proceeds to step S356. In step S356, the distribution destination acquiring unit 40 adds, for example, a shared folder of the storage service 33 as a storage destination.

A distribution screen 1200 as illustrated in FIG. 52 is generated by changing the process in step S32 of the collective distribution processing procedures in FIG. 16, to the processing procedures illustrated in FIGS. 31 and 51.

FIG. 52 is an image diagram of an example of a distribution screen according to the fifth embodiment. In the distribution screen 1200 of FIG. 52, the selected transmission destinations are displayed as the transmission destinations to be the targets of the all transmission execution process, and, therefore, the optimum transmission destination for each participant is posted. Note that the all transmission execution process according to the fifth embodiment is executed, for example, by the procedures of FIG. 18.

By doing so, it is possible to include the shared folder of the storage service 33 in the transmission destination of the image data of the content displayed by the electronic blackboard apparatus 14, thereby facilitating the sharing among the participants.

The present invention is not limited to the above-described embodiments specifically disclosed, and various modifications and changes may be made without departing from the scope of the claims. Note that the information processing system 1 described in the present embodiment is merely an example, and it is obvious that there are various system configuration examples according to the purpose and objective. Note the external service setting information unit 20 is an example of the external service setting information storage recited in the claims. The distribution destination setting information unit 24 is an example of a transmission destination setting information storage. The IC card detecting unit 48 and the participant managing unit 44 are examples of identifiers. The collective distributing unit 42 is an example of a transmitter. The meeting schedule setting unit 50, the shared site setting unit 52, and the shared folder setting unit 54 are examples of an acquirer.

According to one embodiment of the present invention, it is possible to reduce the labor for selecting an external service, for which a setting for usage needs to be made for each user, as the transmission destination, in the case of transmitting data related to an image to be displayed.

The information processing system, the electronic blackboard apparatus, and the recording medium are not limited to the specific embodiments described in the detailed description, and variations and modifications may be made without departing from the spirit and scope of the present invention.

What is claimed is:

1. An information processing system for transmitting data relating to an image to be displayed, the information processing system comprising:
    a hardware processor configured to
        store, in a hardware memory, a setting for using an external service, the setting for using the external service being stored in association with a user among one or more users;
        store, in the hardware memory, transmission destination setting information in which the external service is set as a transmission destination to which the data is addressed, the transmission destination setting information being stored in association with a user among the one or more users and transmission destination types of the external service;

identify the one or more users; and transmit, over a wired or wireless communication network, the data to the transmission destination corresponding to the external service, based on the transmission destination setting information associated with each of the identified one or more users and the transmission destination types of the external service, the transmission destination corresponding to the transmission destination types of the external service being different for each of the one or more users, wherein the data is collectively transmitted to the different transmission destinations that have been set, by the hardware processor, as destinations to which the data is to be transmitted, wherein the hardware processor is further configured to acquire schedule information, in which the one or more users are registered, from a schedule service included in the external service, set the one or more users registered in the schedule information, as the identified one or more users, store a setting for using an external service group including a plurality of the external services, the setting for using the external service group being stored in association with a user among the one or more users, select, as the transmission destination to which the data is addressed, the external service included in the external service group from which the schedule information has been acquired, and display, on a screen, the transmission destination corresponding to the transmission destination types of the external service to which the data is addressed, upon excluding the external service other than the external service included in the external service group from which the schedule information has been acquired.

2. The information processing system according to claim 1, wherein the hardware processor is further configured to display, on a screen, the transmission destination corresponding to the transmission destination types of the external service that is different for each of the one or more users, and accept, from a user among the one or more users, an operation of excluding the transmission destination corresponding to the transmission destination types of the external service, from one or more of the transmission destinations to which the data is addressed.

3. The information processing system according to claim 1, wherein the hardware processor is further configured to acquire shared site information, in which the one or more users are registered, from a shared site service included in the external service, and set the one or more users registered in the shared site information, as the identified one or more users.

4. The information processing system according to claim 1, wherein the hardware processor is further configured to acquire shared folder information, in which the one or more users, sharing a shared folder in the external service, are registered, and set the one or more users registered in the shared folder information, as the identified one or more users.

5. The information processing system according to claim 1, wherein the hardware processor is further configured to transmit the data to an e-mail address of another user in response to determining that the identified one or more users include the another user for which the setting for using the external service and the transmission destination setting information are not stored in association with the another user.

6. The information processing system according to claim 1, wherein the hardware processor is further configured to acquire the schedule information by using the setting for using the external service stored in association with a user identified first among the one or more users.

7. The information processing system according to claim 3, wherein the hardware processor is further configured to acquire the shared site information by using the setting for using the external service stored in association with a user identified first among the one or more users.

8. The information processing system according to claim 4, wherein the hardware processor is further configured to acquire the shared folder information by using the setting for using the external service stored in association with a user identified first among the one or more users.

9. The information processing system according to claim 3, wherein the hardware processor is further configured to store a setting for using an external service group including a plurality of the external services, the setting for using the external service group being stored in association with a user among the one or more users, select, as the transmission destination to which the data is addressed, the external service included in the external service group from which the shared site information has been acquired, and display, on a screen, the transmission destination corresponding to the transmission destination types of the external service to which the data is addressed, upon excluding the external service other than the external service included in the external service group from which the shared site information has been acquired.

10. The information processing system according to claim 4, wherein the hardware processor is further configured to store a setting for using an external service group including a plurality of the external services, the setting for using the external service group being stored in association with a user among the one or more users, select, as the transmission destination to which the data is addressed, the external service included in the external service group from which the shared folder information has been acquired, and display, on a screen, the transmission destination corresponding to the transmission destination types of the external service to which the data is addressed, upon excluding the external service other than the external service included in the external service group from which the shared folder information has been acquired.

11. The information processing system according to claim 1, wherein the external service includes at least one of a storage service and a mail service.

12. The information processing system according to claim 1, wherein the hardware processor is further configured to identify a detected user, among the one or more users, associated with identification information, based on the identification information read from an integrated circuit (IC) card of the detected user.

13. An electronic blackboard apparatus for transmitting data relating to an image to be displayed, the electronic blackboard apparatus comprising:

a hardware processor configured to identify one or more users; and transmit, over a wired or wireless communication network, the data to a transmission destination corresponding to an external service, based on transmission destination setting information associated with each of the identified one or more users and transmission destination types of the external service, the transmission destination corresponding to the transmission destination types of the external service being different for each of the one or more users, the external service being set, in the transmission destination setting information, as the transmission destination to which the data is addressed, and the transmission destination setting information being acquired from a hardware memory storing the transmission destination setting information in association with a user among the one or more users, wherein the data is collectively transmitted to the different transmission destinations that have been set, by the hardware processor, as destinations to which the data is to be transmitted, and wherein the hardware processor is further configured to acquire schedule information, in which the one or more users are registered, from a schedule service included in the external service, set the one or more users registered in the schedule information, as the identified one or more users, store a setting for using an external service group including a plurality of the external services, the setting for using the external service group being stored in association with a user among the one or more users, select, as the transmission destination to which the data is addressed, the external service included in the external service group from which the schedule information has been acquired, and display, on a screen, the transmission destination corresponding to the transmission destination types of the external service to which the data is addressed, upon excluding the external service other than the external service included in the external service group from which the schedule information has been acquired.

14. A non-transitory computer-readable recording medium storing a program that causes a computer to execute a process performed in an electronic blackboard apparatus for transmitting data relating to an image to be displayed, the process comprising:

identifying one or more users; and transmitting, over a wired or wireless communication network, the data to a transmission destination corresponding to an external service, based on transmission destination setting information associated with each of the identified one or more users and transmission destination types of the external service, the transmission destination corresponding to the transmission destination types of the external service being different for each of the one or more users, the external service being set, in the transmission destination setting information, as the transmission destination to which the data is addressed, and the transmission destination setting information being acquired from a hardware memory storing the transmission destination setting information in association with a user among the one or more users, wherein the data is collectively transmitted to the different transmission destinations that have been set, by the computer, as destinations to which the data is to be transmitted, and wherein the process further comprises acquiring schedule information, in which the one or more users are registered, from a schedule service included in the external service, setting the one or more users registered in the schedule information, as the identified one or more users, storing a setting for using an external service group including a plurality of the external services, the setting for using the external service group being stored in association with a user among the one or more users, selecting, as the transmission destination to which the data is addressed, the external service included in the external service group from which the schedule information has been acquired, and displaying, on a screen, the transmission destination corresponding to the transmission destination types of the external service to which the data is addressed, upon excluding the external service other than the external service included in the external service group from which the schedule information has been acquired.

15. The information processing system according to claim 1, wherein the transmission destination types include a storage, an email address and a shared website.

* * * * *